(12) United States Patent
Naegle et al.

(10) Patent No.: US 6,781,585 B2
(45) Date of Patent: *Aug. 24, 2004

(54) GRAPHICS SYSTEM HAVING A SUPER-SAMPLED SAMPLE BUFFER AND HAVING SINGLE SAMPLE PER PIXEL SUPPORT

(75) Inventors: N. David Naegle, Pleasanton, CA (US); Michael F. Deering, Los Altos, CA (US); Michael G. Lavelle, Saratoga, CA (US); Carol Lavelle, Saratoga, CA (US); Scott R. Nelson, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 463 days.

This patent is subject to a terminal disclaimer.

(21) Appl. No.: 09/752,097

(22) Filed: Dec. 29, 2000

(65) Prior Publication Data

US 2001/0028352 A1 Oct. 11, 2001

Related U.S. Application Data

(60) Provisional application No. 60/189,994, filed on Mar. 17, 2000, and provisional application No. 60/175,384, filed on Jan. 11, 2000.

(51) Int. Cl.$^7$ .............................................. G06F 15/00
(52) U.S. Cl. ...................... 345/501; 345/611; 345/613; 345/615; 345/616
(58) Field of Search ................................ 345/501, 611, 345/613, 615, 616

(56) References Cited

U.S. PATENT DOCUMENTS

| | | | |
|---|---|---|---|
| 5,287,438 A | 2/1994 | Kelleher | |
| 2003/0020709 A1 * | 1/2003 | Naegle et al. | ............. 345/419 |

* cited by examiner

*Primary Examiner*—Mark Zimmerman
*Assistant Examiner*—Adam Arnold
(74) *Attorney, Agent, or Firm*—Meyertons Hood Kivlin Kowert & Goetzel, P.C.; Jeffrey C. Hood

(57) ABSTRACT

A computer graphics system that utilizes a super-sampled sample buffer and a sample-to-pixel calculation unit for refreshing the display. The graphics system may have a graphics processor, a super-sampled sample buffer, and a sample-to-pixel calculation unit. The graphics processor renders samples into the sample buffer at computed positions or locations in the sample buffer. The graphics system may utilize a window ID that specifies attributes of pixels on a per object basis. The window ID may specify one or more of a sample mode, filter type, color attributes, or source attributes. The sample mode may include single sample per pixel mode and multiple samples per pixel mode. In implementing a single sample per pixel mode, the graphics system may be further operable to generate a single sample per pixel for certain windows of the screen in order to, for example, provide backwards compatibility with legacy systems with no multi-sampling support. The graphics system may generate samples that have the same value within the region of a single pixel, or the graphics system may utilize a very narrow filter that only selects the center sample in the averaging process.

40 Claims, 28 Drawing Sheets

GRAPHICS SYSTEM HAVING A SUPER-SAMPLED SAMPLE BUFFER AND HAVING SINGLE SAMPLE PER PIXEL SUPPORT

CROSS-REFERENCE TO RELATED APPLICATIONS

This application claims the benefit of U.S. Provisional Application No. 60/175,384, filed Jan. 11, 2000, titled "PHOTOREALISTIC HARDWARE ANTIALIASING" by Michael Deering.

This application claims the benefit of U.S. Provisional Application No. 60/189,994 filed on Mar. 17, 2000.

BACKGROUND OF THE INVENTION

1. Field of the Invention

This invention relates generally to the field of computer graphics and, more particularly, to high performance graphics systems.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modern graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display images that are more complex with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating: "draw a box at these coordinates." The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphics applications, and especially multimedia applications, has made high performance graphics systems a common feature of computer systems. Most computer manufacturers now bundle a high performance graphics system with their systems.

Since graphics systems typically perform only a limited set of functions, they may be customized and therefore are far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

The processing power of 3D graphics systems has been improving at a breakneck pace. A few years ago, shaded images of simple objects could only be rendered at a few frames per second, while today's systems support rendering of complex objects at 60 Hz or higher. At this rate of increase, in the not too distant future, graphics systems will literally be able to render more pixels than a single human's visual system can perceive. While this extra performance may be useable in multiple-viewer environments, it may be wasted in more common primarily single-viewer environments. Thus, a graphics system is desired which is capable of matching the variable nature of the human resolution system (i.e., capable of putting the quality where it is needed or most perceivable).

While the number of pixels is an important factor in determining graphics system performance, another factor of equal import is the quality of the image. For example, an image with a high pixel density may still appear unrealistic if edges within the image are too sharp or jagged (also referred to as "aliased"). One well-known technique to overcome these problems is anti-aliasing. Anti-aliasing involves smoothing the edges of objects by shading pixels along the borders of graphics elements. More specifically, anti-aliasing entails removing higher frequency components from an image before they cause disturbing visual artifacts. For example, anti-aliasing may soften or smooth high contrast edges in an image by forcing certain pixels to intermediate values (e.g., around the silhouette of a bright object superimposed against a dark background).

Another visual effect used to increase the realism of computer images is alpha blending. Alpha blending is a technique that controls the transparency of an object, allowing realistic rendering of translucent surfaces such as water or glass. Another effect used to improve realism is fogging. Fogging obscures an object as it moves away from the viewer. Simple fogging is a special case of alpha blending in which the degree of alpha changes with distance so that the object appears to vanish into a haze as the object moves away from the viewer. This simple fogging may also be referred to as "depth cueing" or atmospheric attenuation, i.e., lowering the contrast of an object so that it appears less prominent as it recedes. More complex types of fogging go beyond a simple linear function to provide more complex relationships between the level of translucence and an object's distance from the viewer. Current state of the art software systems go even further by utilizing atmospheric models to provide low-lying fog with improved realism.

While the techniques listed above may dramatically improve the appearance of computer graphics images, they also have certain limitations. In particular, they may introduce their own aberrations and are typically limited by the density of pixels displayed on the display device.

As a result, a graphics system is desired which is capable of utilizing increased performance levels to increase not only the number of pixels rendered but also the quality of the image rendered. In addition, a graphics system is desired which is capable of utilizing increases in processing power to improve the results of graphics effects such as anti-aliasing.

Prior art graphics systems have generally fallen short of these goals. Prior art graphics systems use a conventional frame buffer for refreshing pixel/video data on the display. The frame buffer stores rows and columns of pixels that exactly correspond to respective row and column locations on the display. Prior art graphics system render 2D and/or 3D images or objects into the frame buffer in pixel form, and then read the pixels from the frame buffer during a screen refresh to refresh the display. Thus, the frame buffer stores the output pixels that are provided to the display. To reduce visual artifacts that may be created by refreshing the screen at the same time the frame buffer is being updated, most graphics systems' frame buffers are double-buffered.

To obtain more realistic images, some prior art graphics systems have gone further by generating more than one sample per pixel. As used herein, the term "sample" refers to calculated information that indicates one or more of the color, depth (z), transparency, and potentially other information, of a particular point on an object or image. For example, a sample may comprise the following component values: a red value, a green value, a blue value, a z value, and an alpha value (e.g., representing the transparency of the sample). A sample may also comprise other information, e.g., a z-depth value, a blur value, an intensity value, brighter-than-bright information, and an indicator that the sample consists partially or completely of control information rather than color information (i.e., "sample control information"). By calculating more samples than pixels (i.e., super-sampling), a more detailed image is calculated than can be displayed on the display device. For example, a graphics system may calculate four samples for each pixel to be output to the display device. After the samples are calculated, they are then combined or filtered to form the pixels that are stored in the frame buffer and then conveyed to the display device. Using pixels formed in this manner may create a more realistic final image because overly abrupt changes in the image may be smoothed by the filtering process.

These prior art super-sampling systems typically generate a number of samples that are far greater than the number of pixel locations on the display. These prior art systems typically have rendering processors that calculate the samples and store them into a render buffer. Filtering hardware then reads the samples from the render buffer, filters the samples to create pixels, and then stores the pixels in a traditional frame buffer. The traditional frame buffer is typically double-buffered, with one side being used for refreshing the display device while the other side is updated by the filtering hardware. Once the samples have been filtered, the resulting pixels are stored in a traditional frame buffer that is used to refresh the display device. These systems, however, have generally suffered from limitations imposed by the conventional frame buffer and by the added latency caused by the render buffer and filtering. Therefore, an improved graphics system is desired which includes the benefits of pixel super-sampling while avoiding the drawbacks of the conventional frame buffer.

U.S. patent application Ser. No. 09/251,453 titled "Graphics System With Programmable Real-Time Sample Filtering" discloses a computer graphics system that utilizes a super-sampled sample buffer and a sample-to-pixel calculation unit for refreshing the display. The graphics processor generates a plurality of samples and stores them into a sample buffer. The graphics processor preferably generates and stores more than one sample for at least a subset of the pixel locations on the display. Thus, the sample buffer is a super-sampled sample buffer which stores a number of samples that may be far greater than the number of pixel locations on the display. The sample-to-pixel calculation unit is configured to read the samples from the super-sampled sample buffer and filter or convolve the samples into respective output pixels, wherein the output pixels are then provided to refresh the display. The sample-to-pixel calculation unit selects one or more samples and filters them to generate an output pixel. The sample-to-pixel calculation unit may operate to obtain samples and generate pixels that are provided directly to the display with no frame buffer therebetween.

While super-sampling may create a more realistic final image, the effects of super-sampling may not always be desired. For example, it may be desirable to display areas and/or windows of the display, such as individual windows in a graphics user interface, with one sample per pixel. This may be desirable, for example, to provide a crisper, sharper image in a window. Alternatively, the system may be required to display images and/or the contents of certain windows that have already been anti-aliased by another graphics processor. In those cases, it would be preferable to not attempt to further anti-alias the image as that would result in loss of sharpness and contrast.

In addition, super-sampling may not be compatible with existing windowing systems such as the X-Windows system. For example, an X-Windows system typically provides a plurality of pixel write commands to a receiving or client system, which indicates where pixels will be written into a traditional frame buffer. Therefore, a system with a super-sampled sample buffer may desire to emulate a traditional frame buffer in order to enable proper receipt and processing of pixel write commands received from an X-Windows system. In addition, certain users of legacy systems such as X-Windows expect the display to appear a certain way, e.g., expect the display output to be aliased. It would thus be preferable to keep the visual output of systems such as X-Windows unchanged. Therefore, in a system with a super-sampled sample buffer, the system may be required to receive pixel write commands or other graphics commands from legacy systems that assume the presence of a traditional frame buffer. In this instance, it may be necessary or desirable for the super-sampled sample buffer graphic system to emulate a traditional frame buffer in order to properly receive and execute these commands which assume a traditional prior art frame buffer.

It would further be desirable to have a method for designating a sample mode for graphics data in a super-sampled sample buffer such as on a per window or per object basis. Such a method could enable the graphics processor to define the behavior of all samples in a pixel for a given window or object. For example, the graphics processor could identify whether the graphics data being rendered is to utilize multi-sampling or only a single sample per pixel on a per window basis.

As a result, a graphics system is desired which is capable of supporting a single sample per pixel in a super-sampled environment. In addition, a graphics system is desired which is capable of efficiently defining the behavior of all samples in a pixel for a given window.

SUMMARY OF THE INVENTION

The present invention comprises a computer graphics system that utilizes a super-sampled sample buffer and a programmable sample-to-pixel calculation unit for refreshing the display. In one embodiment, the graphics system may have a graphics processor, a super-sampled sample buffer, and a sample-to-pixel calculation unit. According to one embodiment of the invention, the graphics system has the ability to use different sample modes for different windows and/or objects on the display.

The graphics processor generates a plurality of samples and stores them into a sample buffer. The graphics processor preferably generates and stores more than one sample for at least a subset of the pixel locations on the display. Thus, the sample buffer is generally a super-sampled sample buffer which stores a number of samples that, in some embodiments, may be far greater than the number of pixel locations on the display. In other embodiments, the total number of samples may be closer to, equal to, or even less than the total number of pixel locations on the display device, but the samples may be more densely positioned in certain areas and less densely positioned in other areas.

The sample-to-pixel calculation unit is configured to read the samples from the super-sampled sample buffer and filter or convolve the samples into respective output pixels, wherein the output pixels are then provided to refresh the display. The sample-to-pixel calculation unit selects one or more samples and filters them to generate an output pixel. Note the number of samples selected and/or filtered by the sample-to-pixel calculation unit is typically greater than one.

The sample-to-pixel calculation unit may access the samples from the super-sampled sample buffer, perform a filtering operation, and then provide the resulting output pixels directly to the display, preferably in real-time. The graphics system may operate without a conventional frame buffer, i.e., the graphics system may not utilize a conventional frame buffer that stores the actual pixel values that are being refreshed on the display. Thus, the sample-to-pixel calculation units may calculate each pixel for each screen refresh on a real time basis or on an on-the-fly basis. The display may then receive and display the output pixels.

The present invention allows for different windows and/or objects of the display to be displayed using different sample modes. Note that, as used herein, the terms "window" and "object" are used interchangeably and refer to a region of the display.

In one embodiment, the sample mode for each window is defined by examining a window ID associated with each window. In one embodiment, the graphics system determines the sample mode on a per sample, per pixel, or per bin basis by examining a window ID that may be associated with each. Thus, the window ID information for each window may be associated with each sample, each bin, or each pixel depending on the desired granularity. The graphics processor may maintain a look-up table where an association is maintained between each of the windows on the display and the sample mode for each window. Example sample modes include multiple samples per pixel (default mode), single sample per pixel, two samples per pixel, four samples per pixel, variable samples per pixel, etc.

In addition, the look-up table may maintain other information about each window such as filter mode, color attributes, and source attributes. Examples of color attributes may include a true color/pseudo-color attribute, a gamma-correction attribute, an anti-aliasing attribute, a depth-of-field attribute, and a brighter-than-bright attribute. Examples of source attributes may include a double-buffer attribute, and an overlay attribute. Examples of filter mode may include an averaging filter mode, a convolution filter mode, a summing filter mode, a filtering function mode, a weighting filter mode, and a randomized function filter mode. Thus, the window ID may specify a number of parameters or characteristics for pixels in the window, including sample mode, color attributes, source attributes, filter type, etc.

In one embodiment, the default sample mode comprises rendering multiple samples per pixel and applying a filter to selected samples to generate output pixels for the display as described above. The default mode is used for the whole display unless another sample mode is specified for a particular window. In some cases, it might be desirable to use alternate sample modes such as a "single sample per pixel" mode for certain windows on the display. Note that, "single sample per pixel", as used herein, does not only refer to rendering one sample per pixel, but rather implies that a single sample value contributes to the final output pixel value.

An alternate sample mode, such as a "single sample per pixel" mode may be desirable for backwards compatibility of the multi-sampled sample buffer with legacy APIs such as X-Windows. X-Windows servers assume a traditional, single-sampled frame buffer when rendering. They provide the graphics system with pixel write commands assuming a single value per pixel. The graphics system of the present invention is capable of operating using the default multi-sampling mode for the whole display except for windows where a legacy API system, such as X-Windows, is outputting graphical data. For those windows, the graphics system of the present invention is capable of using a "single sample per pixel" sample mode to ensure backwards compatibility.

An alternate sample mode, such as the "single sample per pixel" may also be desirable where the anti-aliasing effects of the default multi-sampling mode may not be desired. The graphics system of the present invention is capable of operating using the default multi-sampling mode for the whole display except for windows that are designated as "single sample per pixel" windows. In those windows, the graphics system is capable of using a "single sample per pixel" sample mode to maintain the "aliased" look of the graphics in that window. The anti-aliasing effects of multi-sampling may not be desired, for example, where additional sharpness and contrast are expected in the graphics data.

The graphics system may use various embodiments to implement the single sample per pixel mode. In one embodiment, for each pixel that has been designated to use a "single sample per pixel" sample mode, the graphics processor may receive a single value corresponding to each pixel. This single sample value per pixel may be rendered into the sample buffer for pixels in a respective window or may be received from a legacy API such as X-Windows. In one embodiment, the graphics processor replicates the received value for all the samples within a bin corresponding to a pixel. Thus, the number of samples per pixel is the same within windows designated to use "single sample per pixel" sample mode as with windows designated to use the default multi-sampling sample mode.

The sample-to-pixel calculation unit may or may not perform regular filtering to generate pixel values for "single sample per pixel" windows. In one embodiment, the sample-to-pixel calculation unit selects the sample that is closest to the pixel center and assigns that value to the pixel. In another embodiment, the sample-to-pixel calculation unit performs regular filtering to generate the value for each pixel. Since the single sample value has been replicated for all sample values corresponding to the pixel, regular filtering essentially still only uses the single received sample value in generating the output pixel. Any filter type may be used, and preferably, the range of the filter is restricted within the area of the pixel or bin, i.e., no overlap of the filters occurs.

In another embodiment, for each sample, pixel, or bin that has been designated to use a "single sample per pixel"

sample mode, the graphics processor receives a single value corresponding to each pixel and only renders one sample per pixel. The rendered sample is assigned the received single value and may be rendered at or near the pixel center location. Thus, this method may use different or variable sample densities on a per window basis. During generation of the output pixels, the sample-to-pixel calculation unit reads the value of the single sample and assigns that value to the corresponding pixel without any filtering. Filtering is not necessary since there is only sample corresponding to each pixel.

In yet another embodiment, the graphics processor uses the default super-sampling sample mode for all rendered samples, regardless of the sample mode. In other words, the graphics processor renders a plurality of different samples for each pixel regardless of the sample mode. For those samples corresponding to windows designated as "single sample per pixel" sample mode windows, the sample-to-pixel calculation unit applies a filter that is restricted in area so as to only consider one sample for calculating the value of each pixel. Alternatively, the sample-to-pixel calculation unit may simply select the sample closest to the pixel center for those pixels. For other windows on the screen, the regular default filter may be applied when calculating the values of the pixels, e.g., a plurality of samples in the neighborhood of the pixel center are selected, and the filter is applied to the selected samples to generate the output pixel values.

BRIEF DESCRIPTION OF THE DRAWINGS

The foregoing, as well as other objects, features, and advantages of this invention may be more completely understood by reference to the following detailed description when read together with the accompanying drawings in which:

FIG. 1A illustrates a computer network comprising at least one server computer and one or more client computers, wherein the client computers include one embodiment of a graphics system;

Figure 1:
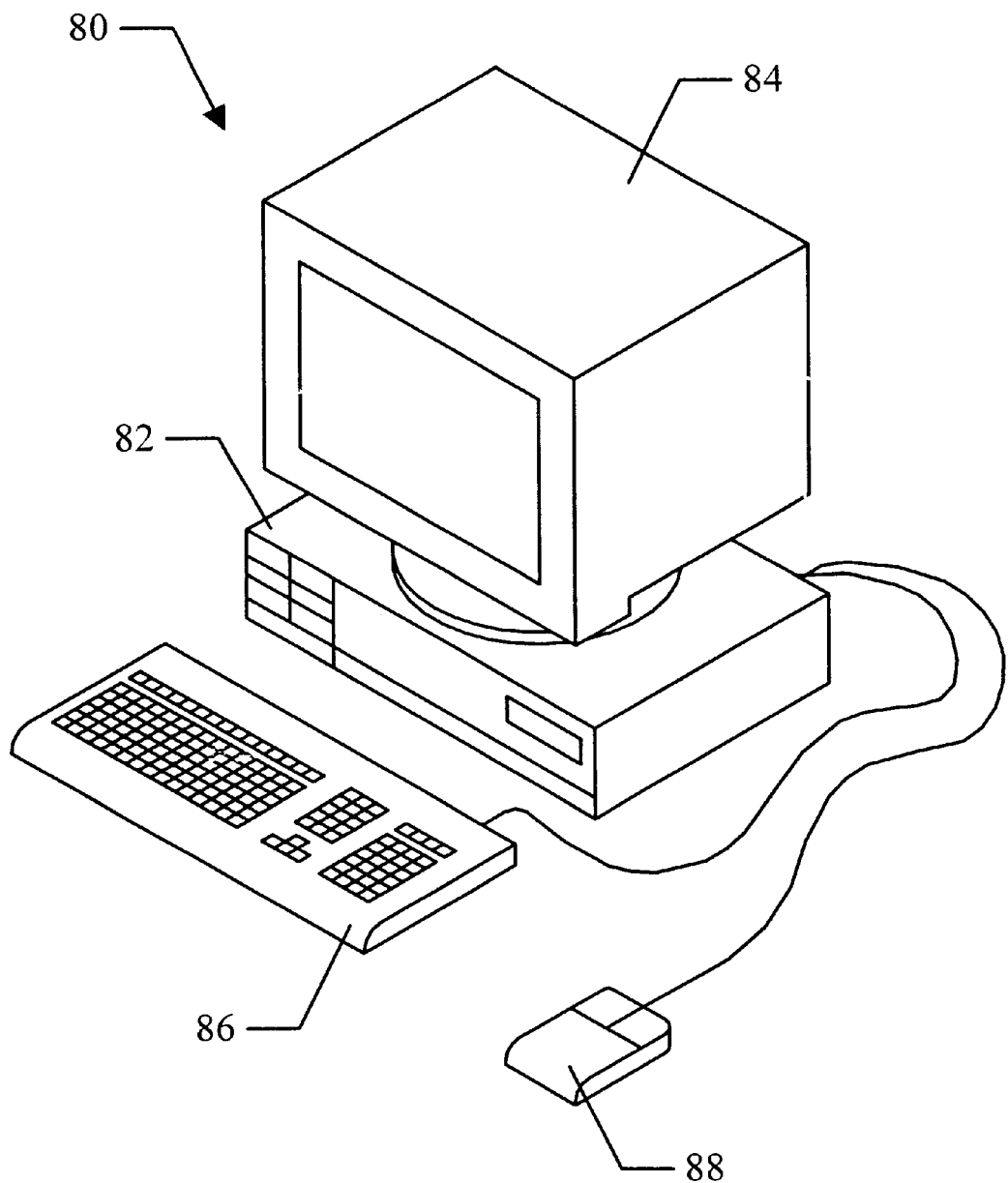
FIG. 1 illustrates one embodiment of a computer system that includes one embodiment of a graphics system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE EMBODIMENTS

Incorporation by Reference

U.S. patent application Ser. No. 09/251,453 titled "Graphics System With Programmable Real-Time Sample Filtering", filed on Feb. 17, 1999, whose inventors are Michael F. Deering, David Naegle, and Scott Nelson, is hereby incorporated by reference as though fully and completely set forth herein.

Computer System—FIG. 1

Referring now to FIG. 1, one embodiment of a computer system 80 that includes a three-dimensional (3-D) graphics system is shown. The 3-D graphics system may be comprised in any of various systems, including a computer system, network PC, Internet appliance, a television, including HDTV systems and interactive television systems, personal digital assistants (PDAs), and other devices which display 2D and or 3D graphics, among others.

As shown, the computer system 80 comprises a system unit 82 and a display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, body sensors, etc.). Application software may be executed by the computer system 80 to display 3-D graphical objects on display device 84.

As described further below, the 3-D graphics system in computer system 80 includes a super-sampled sample buffer with a programmable sample-to-pixel calculation unit to improve the quality and realism of images displayed on display device 84. The sample-to-pixel calculation unit may include a filter or convolve pipeline or other hardware for generating pixels in response to samples in the sample buffer. The sample-to-pixel calculation unit may operate to obtain samples from the sample buffer and generate pixels that are provided directly to the display. The sample-to-pixel calculation unit may operate in a "real-time" or "on-the-fly" fashion.

As used herein the terms "filter" and "convolve" are used interchangeably and refer to mathematically manipulating one or more samples to generate a pixel (e.g., by averaging, by applying a convolution function, by summing, by applying a filtering function, by weighting the samples and then manipulating them, by applying a randomized function, etc.).

As used herein, the term "real-time" refers to a function that is performed at or near the display device's refresh rate. "On-the-fly" means at, near, or above the human visual system's perception capabilities for motion fusion (how often a picture must be changed to give the illusion of continuous motion) and flicker fusion (how often light intensity must be changed to give the illusion of continuous). These concepts are further described in the book "Spatial Vision" by Russel L. De Valois and Karen K. De Valois, Oxford University Press, 1988.

In one embodiment, the graphics system is operable to provide various sample modes for pixels within a frame, preferably on a per window or per object basis. Thus, the graphics system may provide single sample per pixel support in a multi-sample environment. The graphics system may maintain information (e.g., a window ID) on a per window basis regarding the number of samples per pixel and/or filter type used. The graphics system may identify whether a window requires single sample per pixel support, for example, by examining the window ID associated with each sample, sample, or bin. In one embodiment, the graphics system is provided with graphics data, which include a window ID, stating coordinates and color information for a pixel (for example, pixel write commands). In another embodiment, the graphics processor may receive graphics commands from the central processing unit or from another external control unit stating, for example, "draw an object at this location of this color". In this instance, the computer system or graphics processor may assign a window ID to the windows corresponding to the received graphics data.

Computer Network

Figure 20:
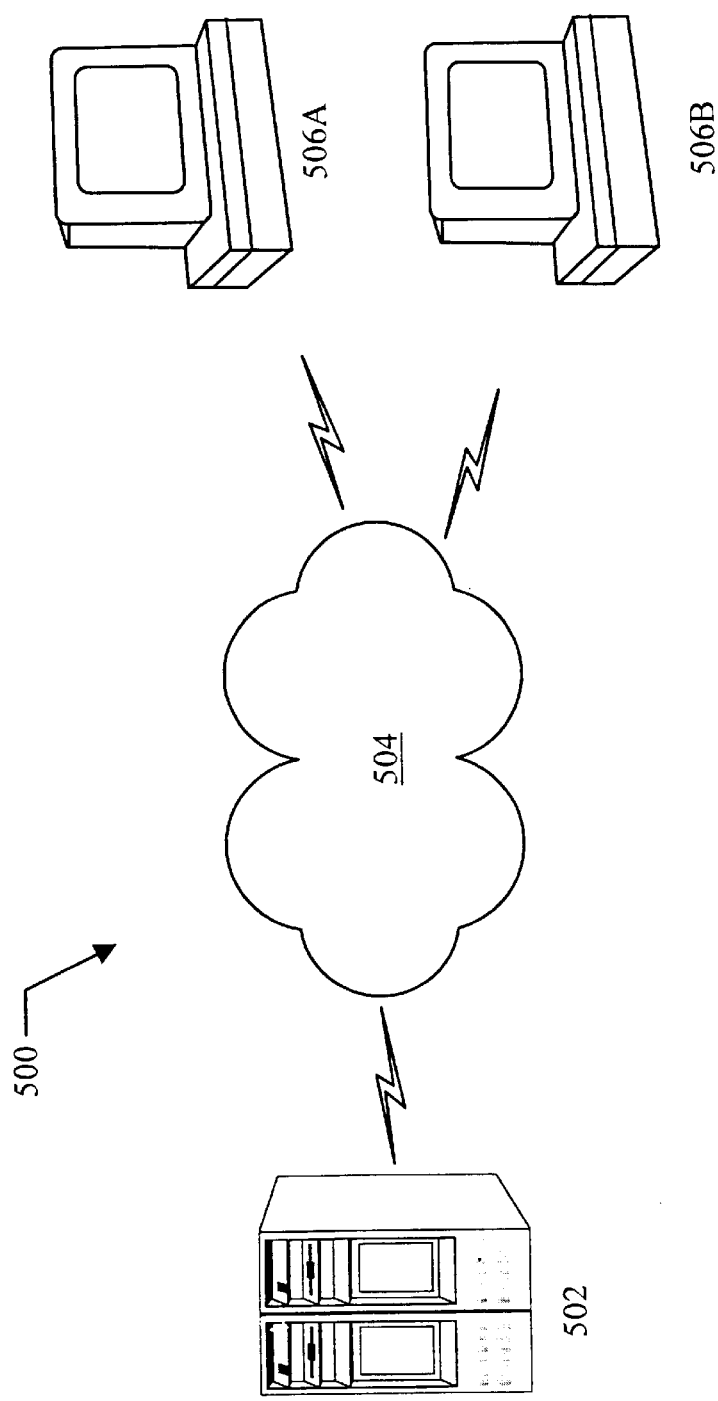
FIG. 20 illustrates a computer network comprising at least one server computer and client computers 506A–B.

Referring now to FIG. 20, a computer network 500 is shown comprising at least one server computer 502 and one or more client computers 506A–B. One or more of the client systems may be configured similarly to computer system 80, with each having one or more graphics systems 112 as described above. Server 502 and client(s) 506 may be joined through a variety of connections 504, such as a local-area network (LAN), a wide-area network (WAN), or an Internet connection. In one embodiment, server 502 may store and transmit 3-D geometry data (which may be compressed) to one or more of clients 506. The clients 506 receive the compressed 3-D geometry data, decompress it (if necessary), and then render the geometry data. The rendered image is then displayed on the client's display device. The clients render the geometry data and display the image using super-sampled sample buffer and real-time filter techniques described herein. In another embodiment, the compressed 3-D geometry data may be transferred between client computers 506.

Figure 2:
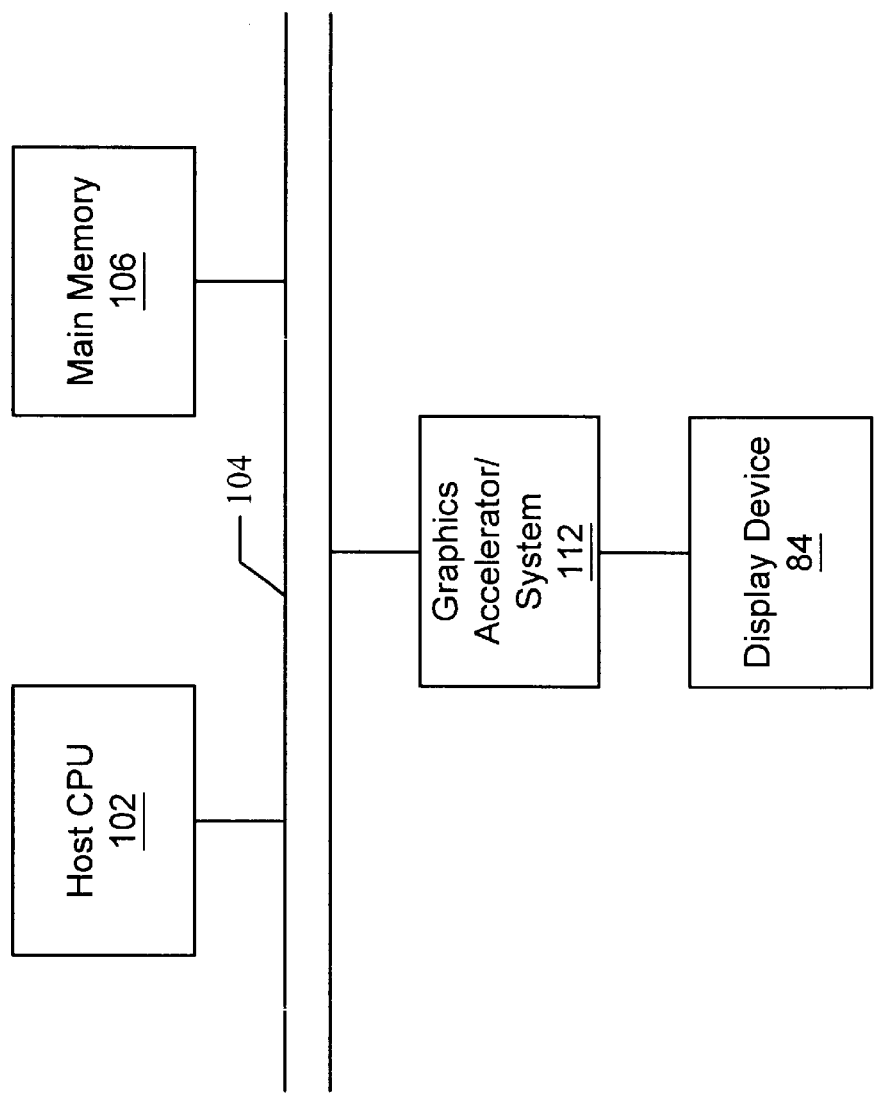
FIG. 2 is a simplified block diagram of the computer system of FIG. 1.

Computer System Block Diagram—FIG. 2

Referring now to FIG. 2, a simplified block diagram illustrating the computer system 80 of FIG. 1 is shown. FIG. 2 may also illustrate the computers 506A, 506B, or 502 of FIG. 20. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors, and CPUs. The system memory 106 may comprise any combination of different types of memory subsystems, including random access memories, (e.g., static random access memories or "SRAMs", synchronous dynamic random access memories or "SDRAMs", and Rambus dynamic access memories or "RDRAM", among others) and mass storage devices. The system bus or host bus 104 may comprise one or more communication or host computer buses (for communication between host processors, CPUs, and memory subsystems) as well as specialized subsystem buses.

A 3-D graphics system or graphics system 112 according to the present invention is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the 3-D graphics system may be coupled to one or more of the buses in computer system 80 and/or may be coupled to various types of buses. In addition, the 3D graphics system may be coupled to a communication port and thereby directly receive graphics data from an external source, e.g., the Internet or a network. As shown in the figure, display device 84 is connected to the 3-D graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer these graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

As will be described below, graphics system 112 may be configured to allow more efficient microcode control, which results in increased performance for handling of incoming color values corresponding to the polygons generated by host processor 102. Note that while graphics system 112 is depicted as part of computer system 80, graphics system 112 may also be configured as a stand-alone device (e.g., with its own built-in display) or as part of another device, such as a PDA, television, or any other device with display capabilities. Graphics system 112 may also be configured as a single chip device or as part of a system-on-a-chip or a multi-chip module.

Figure 3:
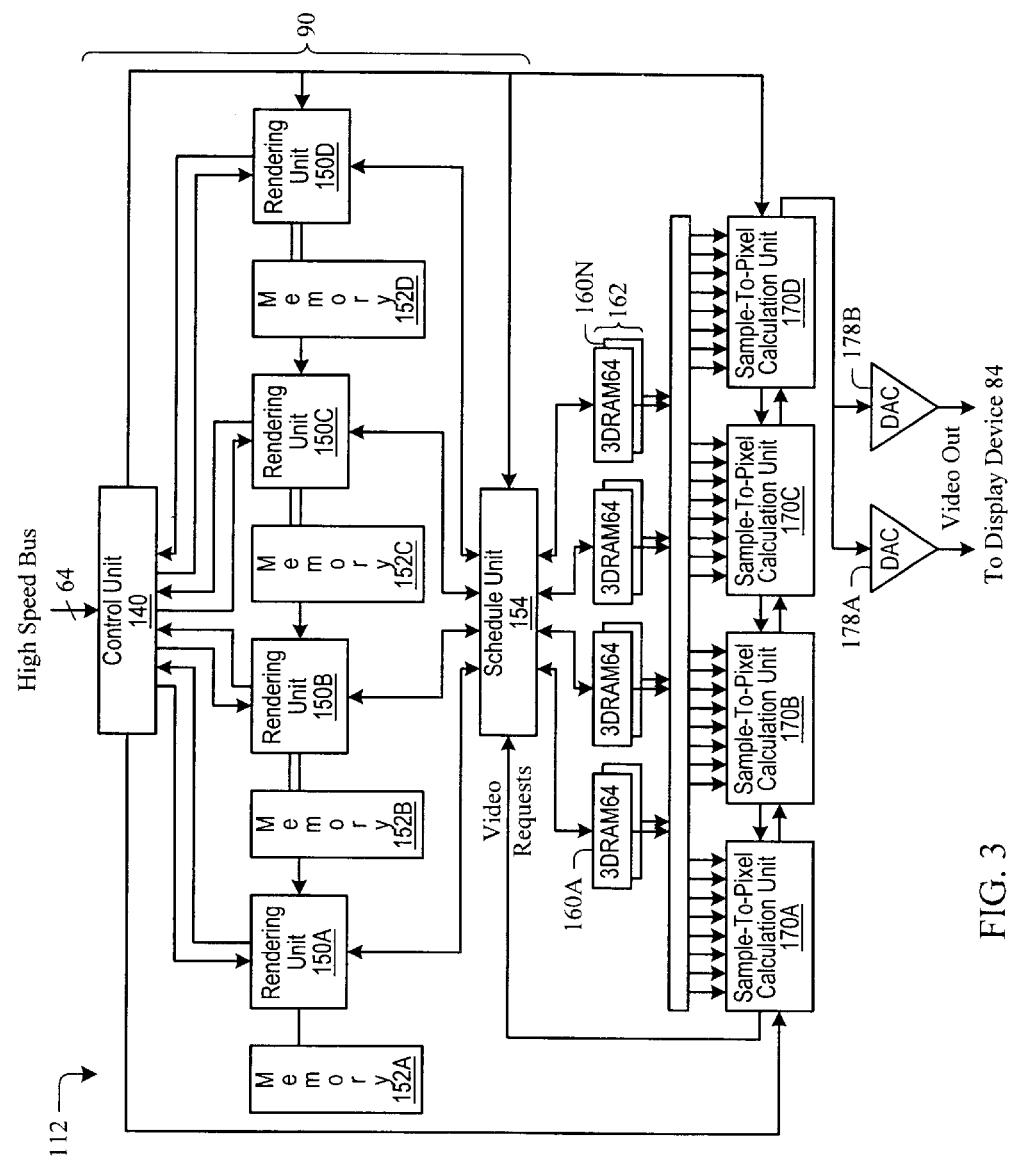
FIG. 3 is a block diagram illustrating more details of one embodiment of the graphics system of FIG. 1.

Graphics System—FIG. 3

FIG. 3 is a block diagram illustrating details of one embodiment of graphics system 112. As shown in the figure, graphics system 112 may comprise one or more graphics processors 90, one or more super-sampled sample buffers 162, and one or more sample-to-pixel calculation units 170A–D. Graphics system 112 may also comprise one or more digital-to-analog converters (DACs) 178A–B. Graphics processor 90 may be any suitable type of high performance processor (e.g., specialized graphics processors or calculation units, multimedia processors, DSPs, or general purpose processors). In one embodiment, graphics processor 90 may comprise one or more rendering units 150A–D. In the embodiment shown, however, graphics processor 90 also comprises one or more control units 140, one or more data memories 152A–D, and one or more schedule units 154. Sample buffer 162 may comprises one or more sample memories 160A–160N as shown in the figure.

A. Control Unit

Control unit 140 operates as the interface between graphics system 112 and computer system 80 by controlling the transfer of data between graphics system 112 and computer system 80. In embodiments of graphics system 112 that comprise two or more rendering units 150A–D, control unit 140 may also divide the stream of data received from computer system 80 into a corresponding number of parallel streams that are routed to the individual rendering units 150A–D. The graphics data may be received from computer system 80 in a compressed form. This may advantageously reduce the bandwidth requirements between computer system 80 and graphics system 112. In one embodiment, control unit 140 may be configured to split and route the data stream to rendering units 150A–D in compressed form.

The graphics data may comprise one or more graphics primitives. As used herein, the term graphics primitive includes polygons, parametric surfaces, splines, NURBS (non-uniform rational B-splines), sub-divisions surfaces, fractals, volume primitives, and particle systems. These graphics primitives are described in detail in the textbook entitled "Computer Graphics: Principles and Practice" by James D. Foley, et al., published by Addison-Wesley Publishing Co., Inc., 1996. Note polygons are referred to throughout this detailed description for simplicity, but the embodiments and examples described may also be used with graphics data comprising other types of graphics primitives.

B. Rendering Units

Rendering units 150A–D (also referred to herein as draw units) are configured to receive graphics instructions and data from control unit 140 and then perform a number of functions, depending upon the exact implementation. For example, rendering units 150A–D may be configured to perform decompression (if the data is compressed), transformation, clipping, lighting, texturing, depth cueing, transparency processing, setup, and screen space rendering of various graphics primitives occurring within the graphics data. Each of these features is described separately below.

Depending upon the type of compressed graphics data received, rendering units 150A–D may be configured to perform arithmetic decoding, run-length decoding, Huffman decoding, and dictionary decoding (e.g., LZ77, LZSS, LZ78, and LZW). In another embodiment, rendering units 150A–D may be configured to decode graphics data that has been compressed using geometric compression. Geometric compression of 3D graphics data may achieve significant reductions in data size while retaining most of the image quality. Two methods for compressing and decompressing 3D geometry are described in U.S. Pat. No. 5,793,371, application Ser. No. 08/511,294, (filed on Aug. 4, 1995, entitled "Method And Apparatus For Geometric Compression Of Three-Dimensional Graphics Data,") and U.S. patent application Ser. No. 09/095,777, filed on Jun. 11, 1998, entitled "Compression of Three-Dimensional Geometry Data Representing a Regularly Tiled Surface Portion of a Graphical Object,"). In embodiments of graphics system 112 that support decompression, the graphics data received by each rendering unit 150 is decompressed into one or more graphics "primitives" which may then be rendered. The term primitive refers to components of objects that define its shape (e.g., points, lines, triangles, polygons in two or three dimensions, polyhedra, or free-form surfaces in three dimensions). Rendering units 150 may be any suitable type of high performance processor (e.g., specialized graphics processors or calculation units, multimedia processors, DSPs, or general purpose processors).

Transformation refers to manipulating an object and includes translating the object (i.e., moving the object to a different location), scaling the object (i.e., stretching or shrinking), and rotating the object (e.g., in three-dimensional space, or "3-space").

Clipping refers to defining the limits of the displayed image (i.e., establishing a clipping region, usually a rectangle) and then not rendering or displaying pixels that fall outside those limits.

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to actually calculate the data used to generate each pixel that will be displayed. In prior art systems, each pixel is calculated and then stored in a frame buffer. The contents of the frame buffer are then output to the display device to create the final image. In the embodiment of graphics system 112 shown in the figure, however, rendering units 150A–D calculate "samples" instead of actual pixel data. This allows rendering units 150A–D to "super-sample" or calculate more than one sample per pixel. Super-sampling is described in greater detail below. The rendering units 150A–D may also generate a greater area of samples than the viewable area of the display 84 for various effects such as panning and zooming. Note that rendering units 150A–B may comprises a number of smaller functional units, e.g., a separate set-up/decompress unit and a lighting unit.

More details on super-sampling are discussed in the following books: "Principles of Digital Image Synthesis" by Andrew Glassner, 1995, Morgan Kaufman Publishing (Volume 1); and "Renderman Companion:" by Steve Upstill, 1990, Addison Wesley Publishing.

In one embodiment of the invention, the rendering units may receive a window ID value that indicate a sample mode for rendering of samples within the window. Based on the received window ID, the rendering units may be operable to selectively render a different number of samples per pixel or per bin on a per window basis. For example, for pixels in a window that has been identified as requiring a single sample per pixel, the rendering units may generate only a single sample per pixel. In other regions of the display, the rendering units may generate the default number of samples per pixel, which is typically greater than one.

Alternatively, the rendering units may render the same number of samples per pixel regardless of the sample mode. In this embodiment, for pixels in a window which has a single sample per pixel mode, the rendering units may render the same sample value for the samples that correspond to particular pixels in the pre-defined window. Here it may be desirable for the rendering unit to know a priori the filter size of the filter applied to the respective pixels. It may also be desirable that the filters not overlap in this region.

C. Data Memories

Each rendering unit 150A–D may be coupled to an instruction and data memory 152A–D. In one embodiment, each data memory 152A–D may be configured to store both data and instructions for rendering units 150A–D. While implementations may vary, in one embodiment each data memory 152A–D may comprise two 8 MByte SDRAMs providing a total of 16 MBytes of storage for each rendering unit 150A–D. In another embodiment, RDRAMs (Rambus DRAMs) may be used to support the decompression and set-up operations of each rendering unit, while SDRAMs may be used to support the draw functions of rendering units 150A–D.

D. Schedule Unit

Schedule unit 154 may be coupled between the rendering units 150A–D and the sample memories 160A–N. Schedule unit 154 is configured to sequence the completed samples and store them in sample memories 160A–N. Note in larger configurations, multiple schedule units 154 may be used in parallel. In one embodiment, schedule unit 154 may be implemented as a crossbar switch.

E. Sample Memories

Super-sampled sample buffer 162 comprises sample memories 160A–160N, which are configured to store the plurality of samples generated by the rendering units. As used herein, the term "sample buffer" refers to one or more memories that store samples. As previously noted, samples are rendered into the sample buffer 162 at positions in the sample buffer which correspond to positions or locations in screen space on the display. The positions may be calculated using various methods, such as grid-based or stochastic position generation. The positions may be calculated or programmatically determined on a per frame basis, a per bin basis, or even a per sample basis. In one embodiment, sample position information is stored with the samples in the sample buffer.

One or more samples are then filtered to form each output pixel (i.e., pixels to be displayed on a display device). The number of samples stored may be greater than, equal to, or less than the total number of pixels output to the display device to refresh a single frame. Each sample may correspond to one or more output pixels. As used herein, a sample "corresponds" to an output pixel when the sample's information contributes to the final output value of the pixel. Note, however, that some samples may contribute zero to their corresponding output pixel after filtering takes place. Also, some samples may be rendered and stored in the sample buffer which are outside the viewable area of the display device 84 for one or more frames, wherein these samples may be used in subsequent frames for various display effects such as panning and zooming.

Stated another way, the sample buffer stores a plurality of samples that have positions that correspond to locations in screen space on the display, i.e., the samples contribute to one or more output pixels on the display. The number of stored samples may be greater than the number of pixel locations, and more than one sample may be combined in the convolution (filtering) process to generate a particular output pixel displayed on the display device. Any given sample may contribute to one or more output pixels.

Sample memories 160A–160N may comprise any of a number of different types of memories (e.g., SDRAMs, SRAMs, RDRAMs, 3DRAMs, or next-generation 3DRAMs) in varying sizes. In one embodiment, each schedule unit 154 is coupled to four banks of sample memories, wherein each bank comprises four 3DRAM-64 memories. Together, the 3DRAM-64 memories may form a 116-bit deep super-sampled sample buffer that stores multiple samples per pixel. For example, in one embodiment, each sample memory 160A–160N may store up to sixteen samples per pixel.

3DRAM-64 memories are specialized memories configured to support full internal double buffering with single buffered Z in one chip. The double-buffered portion comprises two RGBX buffers, wherein X is a fourth channel that can be used to store other information (e.g., alpha). 3DRAM-64 memories also may include a lookup table that receives window ID information and controls an internal 2-1 or 3-1 multiplexer that selects which buffer's contents will be output. 3DRAM-64 memories are next-generation 3DRAM memories that may soon be available from Mitsubishi Electric Corporation's Semiconductor Group. In one embodiment, four chips used in combination are sufficient to create a double-buffered 1280×1024 super-sampled sample buffer. Since the memories are internally double-buffered, the input pins for each of the two frame buffers in the double-buffered system are time multiplexed (using multiplexers within the memories). The output pins may similarly be time multiplexed. This allows reduced pin count while still providing the benefits of double buffering. 3DRAM-64 memories further reduce pin count by not having z output pins. Since z comparison and memory buffer selection is dealt with internally, this may simplify sample buffer 162 (e.g., using less or no selection logic on the output side). Use of 3DRAM-64 also reduces memory bandwidth since information may be written into the memory without the traditional process of reading data out, performing a z comparison, and then writing data back in. Instead, the data may be simply written into the 3DRAM-64, with the memory performing the steps described above internally.

However, in other embodiments of graphics system 112, other memories (e.g., SDRAMs, SRAMs, RDRAMs, or current generation 3DRAMs) may be used to form sample buffer 162.

Graphics processor 90 may be configured to generate a plurality of sample positions according to a particular sample positioning scheme (e.g., a regular grid, a perturbed regular grid, stochastic, etc.).

In one embodiment of the invention, the graphics processor receives the window ID value for a window and generates or renders sample positions based on the window. For example, the graphics processor may receive pixel write commands with a window ID from a legacy API such as X-Windows.

The sample position information for each of the samples may be stored for later use by the sample-to-pixel calculation unit(s). For example, the graphics processor 90 may store the sample position information in the sample buffer with the samples, or may store the sample position information in a separate sample position memory. Alternatively, the sample position information (e.g., offsets that are added to regular grid positions to form the sample positions) may be pre-determined or pre-computed using one of the above schemes and simply read from the sample position memory (e.g., a RAM/ROM table). The sample position information may be pre-computed by the graphics processor, by the host CPU, or by other logic.

The sample position information may comprise coordinate values relative to a sample buffer coordinate system, e.g., coordinate values relative to the display space. The sample position information may also comprise offset values, wherein the offset values are relative to pre-defined locations in the sample buffer, such as a pre-defined regular grid, pre-defined bins, or pixel center coordinates.

Upon receiving a polygon that is to be rendered, graphics processor 90 determines which samples reside within the polygon based upon the sample position information. Graphics processor 90 renders the samples that fall within the polygon and stores rendered samples in sample memories 160A–N. Note as used herein the terms render and draw are used interchangeably and refer to calculating color values for samples. Depth values, alpha values, and other per-sample values may also be calculated in the rendering or drawing process.

Furthermore, as mentioned above, the graphics processor may generate a different number of samples per pixel for different windows on the screen. The central processing unit may designate some windows with different sample modes, e.g., to not utilize multisampling, by tagging a window ID for the respective window.

F. Sample-to-Pixel Calculation Units

Sample-to-pixel calculation units 170A–D (sometimes collectively referred to as sample-to-pixel calculation unit 170) may be coupled between sample memories 160A–N and DACs 178A–B. Sample-to-pixel calculation units 170A–D are configured to read selected samples from sample memories 160A–N, wherein the samples are selected based on the position information of the samples, and then perform a convolution (e.g., a filtering and weighting function or a low pass filter) on the samples to generate the output pixel values which are output to DACs 178A–B. The sample-to-pixel calculation units 170A–D may be programmable to allow them to perform different filter functions at different times, depending upon the type of output desired. In one embodiment, the sample-to-pixel calculation units 170A–D may implement a 5×5 super-sample reconstruction band-pass filter to convert the super-sampled sample buffer data (stored in sample memories 160A–N) to single pixel values. In other embodiments, calculation units 170A–D may filter a selected number of samples to calculate an output pixel. The filtered samples may be multiplied by a variable weighting factor that gives more or less weight to samples having positions close to the center of the pixel being calculated. Other filtering functions may also be used either alone or in combination, e.g., tent filters, circular and elliptical filters, Mitchell filters, band pass filters, sync function filters, etc.

Sample-to-pixel calculation units 170A–D may also be configured with one or more of the following features: color look-up using pseudo color tables, direct color, inverse gamma correction, filtering of samples to pixels, and conversion of pixels to non-linear light space. Other features of sample-to-pixel calculation units 170A–D may include programmable video timing generators, programmable pixel clock synthesizers, and crossbar functions. Once the sample-to-pixel calculation units have manipulated the timing and color of each pixel, the pixels are output to DACs 178A–B.

Sample-to-pixel calculation units may utilize a window ID and generate output pixels based on the window. For example, for a window that has been designated to use regular multi-sampling, the sample-to-pixel calculation units perform regular filtering operations, such as selecting one or more samples within a neighborhood of a pixel center. For a window that is designated with a single sample per pixel mode, the sample-to-pixel calculation units 170 may turn off filtering for that window. In another embodiment, for a window that has been designated not to use multi-sampling, the sample-to-pixel calculation units may select a single sample per pixel, for example, the sample that is closest to the pixel center. In yet another embodiment, for a window that has been designated not to use multi-sampling and where all sample values for a pixel have the same value, the sample-to-pixel calculation units may perform regular, multi-sample filtering, preferably with the filter area limited so that there is no overlap of the filters for different pixels.

G. DACs

DACs 178A–B operate as the final output stage of graphics system 112. The DACs 178A–B serve to translate the digital pixel data received from cross units 174A–B into analog video signals that are then sent to the display device. Note in one embodiment DACs 178A–B may be bypassed or omitted completely in order to output digital pixel data in lieu of analog video signals. This may be useful when display device 84 is based on a digital technology (e.g., an LCD-type display or a digital micro-mirror display).

Figure 4:
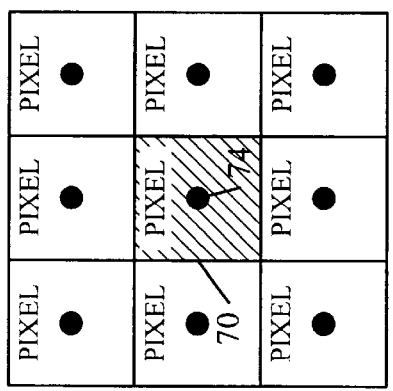
FIG. 4 illustrates traditional pixel calculation.

Super-Sampling—FIGS. 4–5

FIG. 4 illustrates an example of traditional, non-super-sampled pixel value calculation. Each pixel has exactly one data point calculated for it, and the single data point is located at the center of the pixel. For example, only one data point (i.e., sample 74) contributes to value of pixel 70.

Figure 5B:
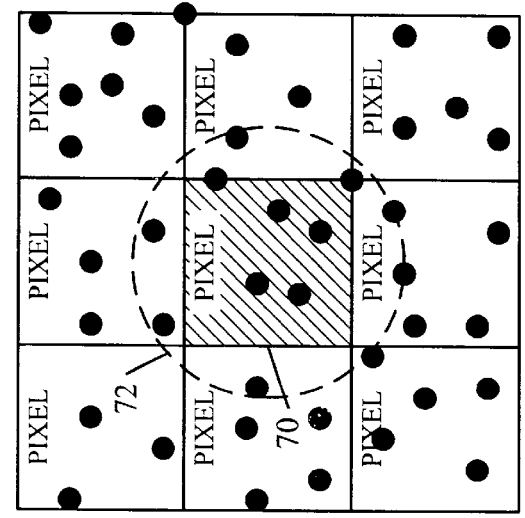
FIG. 5B illustrates a random distribution of samples.
Figure 5A:
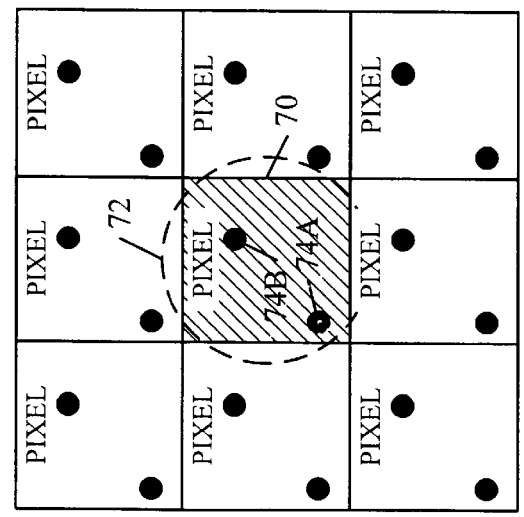
FIG. 5A illustrates one embodiment of super-sampling.

Turning now to FIG. 5A, an example of one embodiment of super-sampling is illustrated. In this embodiment, a number of samples are calculated. The number of samples may be related to the number of pixels or completely independent of the number of pixels. In this example, 18 samples are distributed in a regular grid across nine pixels. Even with all the samples present in the figure, a simple one to one correlation could be made (e.g., by throwing out all but the sample nearest to the center of each pixel). However, the more interesting case is performing a filtering function on multiple samples to determine the final pixel values. Also, as noted above, a single sample can be used to generate a plurality of output pixels, i.e., sub-sampling.

A circular filter 72 is illustrated in the figure. In this example, samples 74A–B both contribute to the final value of pixel 70. This filtering process may advantageously improve the realism of the image displayed by smoothing abrupt edges in the displayed image (i.e., performing anti-aliasing). Filter 72 may simply average samples 74A–B to form the final value of output pixel 70, or it may increase the contribution of sample 74B (at the center of pixel 70) and diminish the contribution of sample 74A (i.e., the sample farther away from the center of pixel 70). Circular filter 72 is repositioned for each output pixel being calculated so the center of filter 72 coincides with the center position of the pixel being calculated. Other filters and filter positioning schemes are also possible and contemplated.

Turning now to FIG. 5B, another embodiment of super-sampling is illustrated. In this embodiment, however, the samples are positioned randomly. More specifically, different sample positions are selected and provided to graphics processor 90 (and render units 150A–D), which calculate color information to form samples at these different locations. Thus the number of samples falling within filter 72 may vary from pixel to pixel.

Super-Sampled Sample Buffer with Real-Time Convolution—FIGS. 6–13

Figure 6:
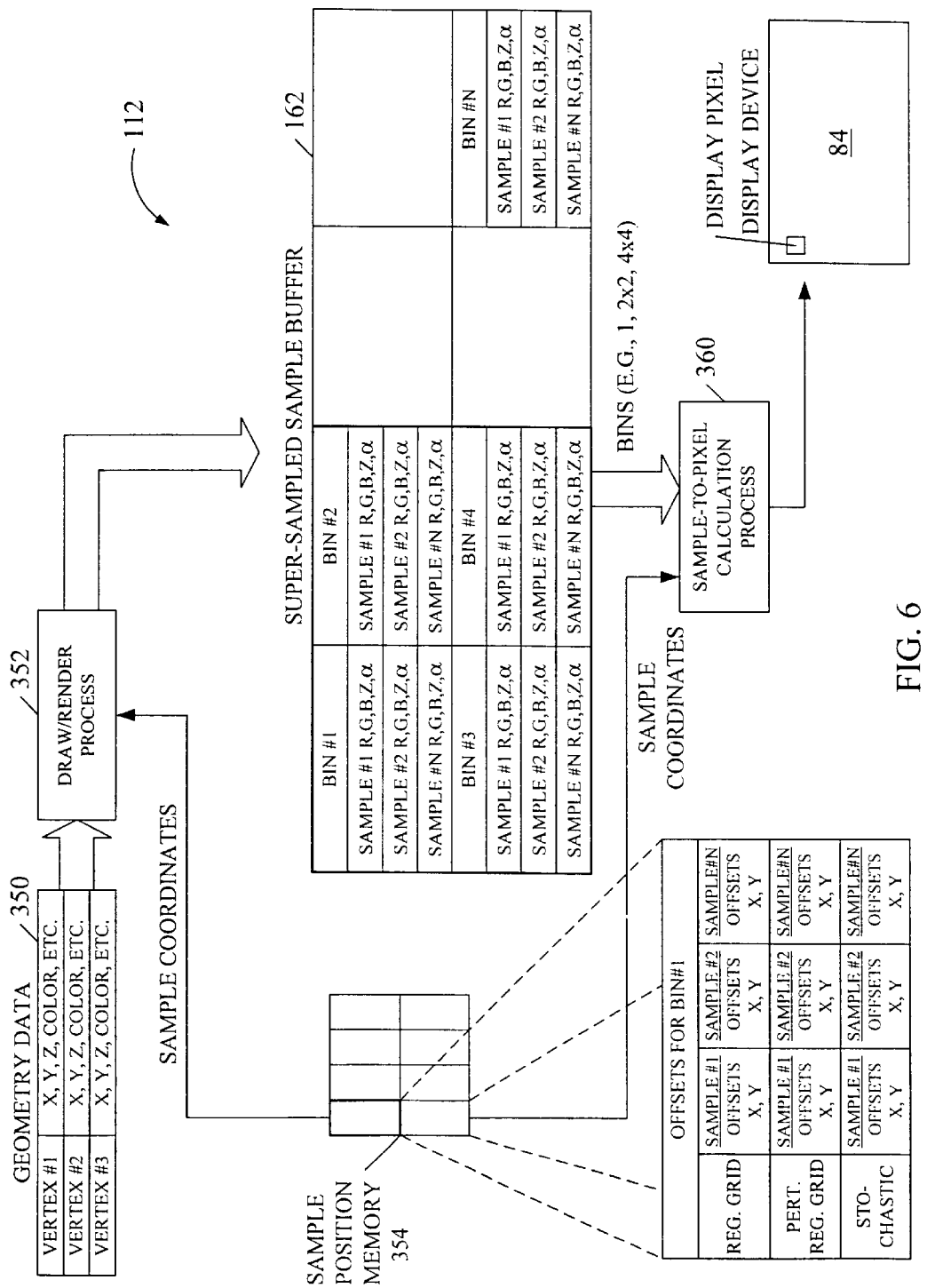
FIG. 6 illustrates one embodiment of a graphics system having a super-sampled sample buffer and having a single sample position memory.
Figure 7:
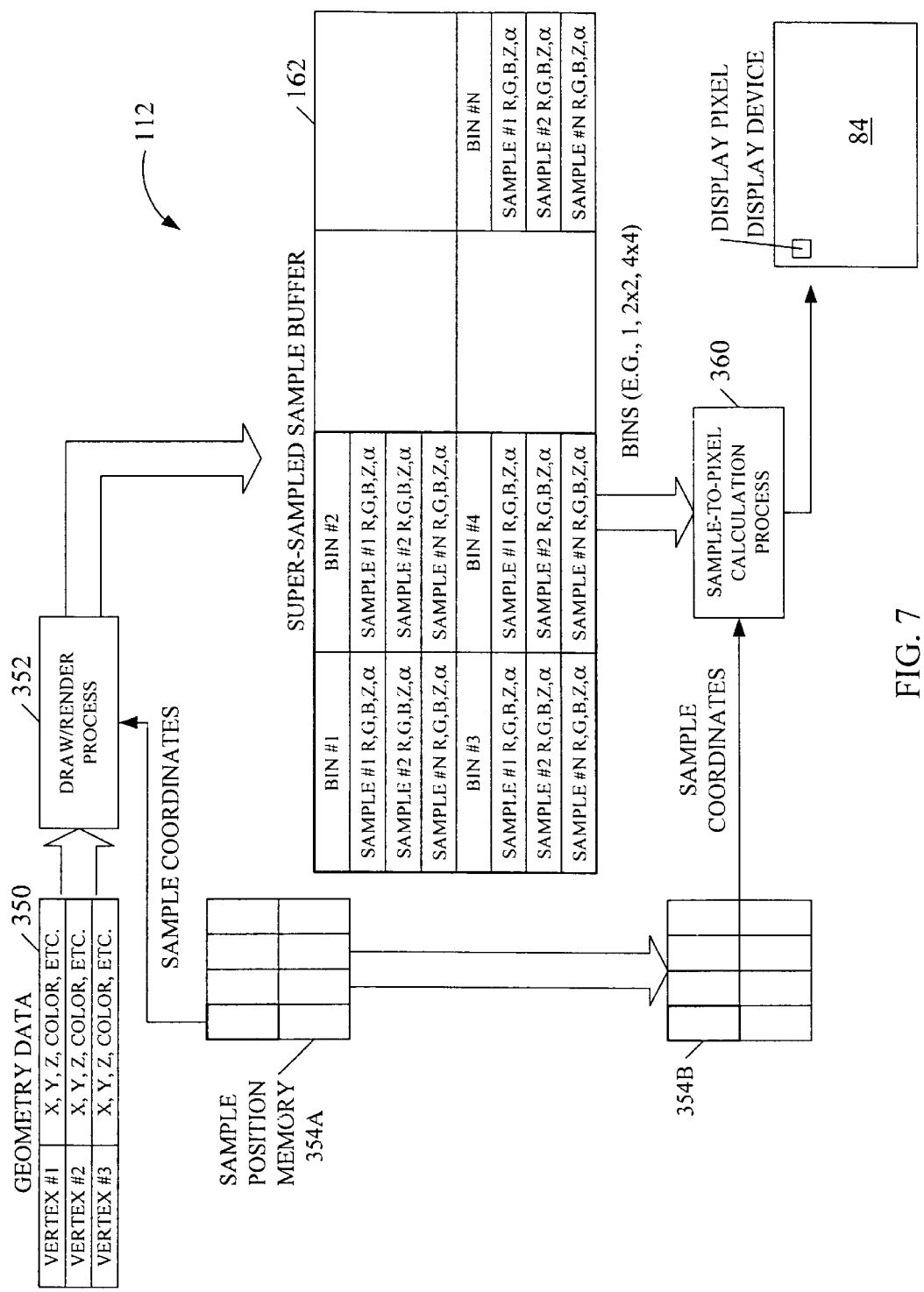
FIG. 7 illustrates another embodiment of a graphics system having a super-sampled sample buffer and including a double-buffered sample position memory.

FIGS. 6 and 7 illustrate possible configurations for the flow of data through one embodiment of graphics system 112. As the figures show, geometry data 350 is received by graphics system 112 and used to perform draw or render process 352. The draw process 352 is implemented by one or more of control unit 140, rendering units 150, memories 152, and schedule unit 154. Geometry data 350 comprises data for one or more polygons. Each polygon comprises a plurality of vertices (e.g., three vertices in the case of a triangle), some of which may be shared. Data such as x, y, and z coordinates, color data, lighting data and texture map information may be included for each vertex.

The draw process 352 may also generate sample coordinates or sample position information for rendering of samples, or may receive pre-computed sample position information from a sample position memory 354. As used herein, the term "sample position information" or simply "position information" refers to information which indicates or specifies positions or locations of samples rendered into the sample buffer 162, wherein the positions or locations in the sample buffer 162 are generally relative to or correspond to positions or locations in a screen space of the display. In general, the terms "position" and "position information" are used interchangeably.

As discussed above, sample positions may be generated according to a particular sample positioning scheme. Example sample positioning schemes include a regular grid (e.g., regular square grid or a regular hexagonal grid), a perturbed regular grid, or stochastic position generation, among others. Graphics system 112 may receive an indication from the operating system, device driver, or the geometry data 350 that indicates which type of sample positioning scheme is to be used. Thus the graphics system 112 (e.g., graphics processor 90) is configurable or programmable to generate position information according to one or more different schemes. More detailed information on several sample position schemes are described further below (see description of FIG. 8).

Graphics processor 90 executing draw process 352 utilizes sample position information during rendering. The graphics processor 90 may be configured to generate the plurality of sample positions (position information) during rendering, or the sample positions may be generated by a graphics driver executing on the host CPU, or by other logic. The sample positions may also be pre-computed and stored in the sample position memory 354 for later use during rendering, wherein the position information is pre-computed by one of the graphics processor 90, host CPU, or other logic. Thus the draw process 352, or other hardware or software, may generate the plurality of sample positions in real time during the rendering process and then store the position information in the sample position memory 354, or the sample positions may be pre-computed and stored in the sample position memory 354 for later use during rendering.

As shown in FIG. 6, the sample position information may be stored in a separate sample position memory 354. For example, the sample position information (e.g., offsets that are added to regular grid positions to form the sample positions) may be pre-determined or pre-computed using one of the above schemes and read from the sample position memory 354 (e.g., a RAM/ROM table) during rendering. The sample positions may be pre-computed by the graphics processor 90, by the host CPU, or by other logic as noted above. Alternatively, the graphics processor 90 may generate the sample position information during rendering and store the sample position information in the sample position memory 354.

In one embodiment, position memory 354 is embodied within rendering units 150A–D. In another embodiment, position memory 354 may be realized as part of texture and render memories 152A–152D, or as a separate memory. Sample position memory 354 is configured to store position information for samples that are calculated in draw process 352 and then stored into super-sampled sample buffer 162.

The sample position memory 354 may comprise a single memory (FIG. 6) or may comprise two memories (FIG. 7), e.g., a double buffered configuration. The double buffered sample position memories 354A and 354B allow for programmability of the sample position information, such as on a per frame or per bin basis, or a per sample basis. The double buffered embodiment of FIG. 7 is discussed further below.

In one alternative embodiment, the sample position information may also be stored in the sample buffer 162 with the samples. For example, the graphics processor 90 may generate the sample position information during rendering and store the sample position information with the samples in the sample buffer 162. Since the sample buffer 162 is already double buffered, storage of the sample position information in the sample buffer 162 effectively double buffers the sample position information. In another embodiment, lookup table (LUT) tags or indices are stored with the samples in the sample buffer 162, wherein these tags reference offsets stored in a separate sample position memory 354.

In one embodiment, the sample position information may comprise entire sample position "addresses" or coordinates. However, this may involve increasing the size of position memory 354 or may involve increasing the size of the sample buffer. Alternatively, the sample position information may comprise only one or more offsets for each sample. Storing only the offsets may use less storage space than storing each sample's entire position. The one or more offset values may comprise x- and y-offsets or angular and distance offsets (polar coordinates), among others.

The one or more offset values may comprise offset values relative to a predefined regular grid, e.g., may be relative to pre-determined bin coordinates or predetermined pixel center coordinates. For example, the one or more offset values may be relative to the bin in which the sample is located, such as the lower left corner of the bin. The offsets may be based on any of the various sample position schemes discussed above.

The sample position of a sample may be determined by combining the one or more offset values of the sample with the reference coordinates, e.g., coordinates from a regular grid, pre-determined bin coordinates, or pre-determined pixel center coordinates, among others. The offset values stored in sample position memory 354 or in the sample buffer 162 may be read by each of the graphics processor 90 and/or the sample-to-pixel calculation unit 170 and processed to calculate sample positions for the samples. Alternatively, the offset values stored in sample position memory 354 may be read by a dedicated sample position calculation unit (not shown) and processed to calculate example sample positions for graphics processor 90 and/or for sample-to-pixel calculation unit 170. More detailed information on sample position offsets is included below (see description of FIGS. 9 and 10).

As mentioned above, the graphics system may include sample position memory 354 coupled to the sample-to-pixel calculation unit 170 which stores the offset values for each of the samples. As shown in FIGS. 6 and 7, the sample-to-pixel calculation unit 170 is operable to access the memory 354 to determine the offset values of the samples. The memory 354 may be a look-up table memory, wherein the sample-to-pixel calculation unit 170 is operable to index into the look-up table memory 354 to determine the offset values of the samples.

The samples may be stored in the sample buffer 162 according to bins, wherein each respective bin defines a region in the sample buffer 162 in which samples in the respective bin are located. As used herein, the term "bin" refers to a region or area in screen-space and contains however many samples are in that area (e.g., the bin may be 1×1 pixels in area, 2×2 pixels in area, etc.). The term "screen space" refers generally to the coordinate system of the display device. The use of bins may simplify the storage and access of samples in sample buffer 162. A number of different bin sizes may be used (e.g., one sample per bin, four samples per bin, etc.). In the preferred embodiment, each bin has an xy-position that corresponds to a particular location on the display. The bins are preferably regularly spaced. In this embodiment the bins' xy-positions may be determined from the bin's storage location within sample buffer 162. The bins' positions correspond to particular positions on the display. In some embodiments, the bin positions may correspond to pixel centers, while in other embodiments the bin positions correspond to points that are located between pixel centers.

The one or more offset values may comprise offset values relative to a bin. Thus a position of each sample within a respective bin may be determined by using the one or more offset values associated with the sample and the sample's bin position. As one example, position memory 354 may store pairs of 8-bit numbers, each pair comprising an x-offset and a y-offset (other possible offsets are also possible, e.g., a time offset, a z-offset, polar coordinate offsets, etc.). When added to a bin position, each pair defines a particular position in screen space. To improve read times, memory 354 may be constructed in a wide/parallel manner so as to allow the memory to output more than one sample location per clock cycle.

In one embodiment, the samples are stored in the sample buffer 162 according to a bin ordering, wherein, for a respective bin, the bin ordering indicates a position of the samples in the respective bin. Thus, for a respective sample, the sample-to-pixel calculation unit 170 is operable to generate the position of the respective sample based at least partly on the bin ordering of the respective sample within its bin. For example, the offset values may be stored in the memory 354 according to the bin ordering of the samples, and the sample-to-pixel calculation unit 170 is operable to use the bin ordering of the samples in the bins to index into the memory 354 to determine the offset values of the samples. The sample position memory 354 may store a number of offset values less than the total number of samples in the sample buffer. For example, the sample position memory 354 may store a number of offset values corresponding to only one bin of the sample buffer 162. In this instance, the sample-to-pixel calculation unit 170 is operable to reuse these offset values for each bin of the sample buffer 162. The sample-to-pixel calculation unit 170 may operate to manipulate bits in the sample position memory addresses to obtain different offset values for samples in the bins as described above.

Once the sample positions have been read from sample position memory 354, draw process 352 selects the sample positions that fall within the polygon currently being rendered. Draw process 352 then calculates the z and color information (which may include alpha or other depth of field information values) for each of these samples and stores the data into sample buffer 162. In one embodiment, the sample buffer may only single-buffer z values (and perhaps alpha values) while double buffering other sample components such as color. Unlike prior art systems, graphics system 112 may double buffer all samples (although not all sample components may be double-buffered, i.e., the samples may have components that are not double-buffered, or not all samples may be double-buffered). In one embodiment, the samples are stored into sample buffer 162 in bins. In some embodiments, the size of bins, i.e., the quantity of samples within a bin, may vary from frame to frame and may also vary across different regions of display device 84 within a single frame. For example, bins along the edges of display device may comprise only one sample, while bins corresponding to pixels near the center of display device 84 may comprise sixteen samples. Note the area of bins may vary from region to region. The use of bins will be described in greater detail below in connection with FIG. 11.

In parallel and preferably independently of draw process 352, filter process 360 is configured to read samples from sample buffer 162, filter (i.e., filter) them, and then output the resulting output pixel to display device 84. Sample-to-pixel calculation units 170 implement filter process 380. Thus, for at least a subset of the output pixels, the filter process is operable to filter a plurality of samples to produce a respective output pixel. In one embodiment, filter process 360 is configured to: (i) determine the distance from each sample to the center of the output pixel being filtered; (ii) multiply the sample's components (e.g., color and alpha) with a filter value that is a specific (programmable) function of the distance; (iii) sum all the weighted samples that contribute to the output pixel, and (iv) normalize the resulting output pixel. The filter process 360 is described in greater detail below (see description accompanying FIGS. 11, 12, and 14). Note the extent of the filter need not be circular (i.e., it may be a function of x and y instead of the distance), but even if the extent is, the filter need not be circularly symmetrical. The filter's "extent" is the area within which samples can influence the particular pixel being calculated with the filter.

In one embodiment of the invention, the filtering process receives focus information and uses the focus information to selectively adjust the filtering to provide depth cueing or convergence cueing. This operation is discussed below with respect to FIG. 16.

FIG. 7—Double Buffered Sample Position Memories

FIG. 7 illustrates an alternate embodiment of graphics system 112, wherein two or more sample position memories 354A and 354B are utilized. As shown in FIG. 7, the graphics includes a first sample position memory 354A and a second sample position memory 354B. The first sample position memory 354A is coupled to the graphics processor 90 and stores the position information for each of the samples. The graphics processor 90 uses the first memory 354A in rendering the samples into the sample buffer 162. As discussed above, the graphics processor 90 may also operate to generate and store the sample position information in the memory 354A. The second sample position memory 354B is coupled to the sample-to-pixel calculation unit 170 and also stores the position information for each of the samples. The sample-to-pixel calculation unit 170 is operable to access the second memory 354B to determine the position information of the samples. The sample-to-pixel calculation unit 170 uses the position information obtained from the second memory 354B to aid in selecting samples for filtering.

As shown, the first sample position memory 354A is configured to provide sample position information to the second sample position memory 354B, thus effectively providing a double buffered configuration. For example, the first memory 354A is operable to transfer current position information for a current frame to the second memory 354B. The sample-to-pixel calculation unit 170 is operable to use the second memory 354B to determine the current position information of the samples. Meanwhile, the graphics processor is operable to store subsequent position information for a subsequent frame into the first memory 354A contemporaneously with the sample-to-pixel calculation unit 170 using the second memory 354B to determine the current position information of the samples for the current frame.

Thus, the sample position memories 354A–B are essentially double-buffered. If the sample positions are kept the same from frame to frame, then the sample positions may be single buffered. However, if the sample positions may vary from frame to frame, then graphics system 112 may be advantageously configured to double-buffer the sample positions. The sample positions may be double buffered with one buffer on the rendering side (i.e., memory 354A) and one buffer on the filter/convolve side (i.e., memory 354B). The sample positions may also be double buffered on the rendering side (i.e., memory 354A may be double buffered) and or the filter/convolve side (i.e., memory 354B may be double buffered). Other combinations are also possible. For example, memory 354A may be single-buffered, while memory 354B is doubled buffered. This configuration may allow one side of memory 354B to be used for refreshing (i.e., by filter/convolve process 360) while the other side of memory 354B is being updated.

In this configuration, graphics system 112 may change sample position schemes on a per-frame basis by shifting the sample positions (or offsets) from memory 354A to double-buffered memory 354B as each frame is rendered. Thus, the positions used to calculate the samples (read from memory 354A) are copied to memory 354B for use during the filtering process (i.e., the sample-to-pixel conversion process). Once the position information has been copied to memory 354B, position memory 354A may then be loaded with new sample position offsets to be used for the second frame to be rendered. In this way the sample position information follows the samples from the draw/render process to the filter process.

In one alternative embodiment, the sample position information may also be stored in the sample buffer 162 with the samples, as noted above. For example, the graphics processor 90 may generate the sample position information during rendering and store the sample position information with the samples in the sample buffer 162. Since the sample buffer 162 is already double buffered, storage of the sample position information in the sample buffer 162 effectively double buffers the sample position information. In this embodiment, the graphics processor 90 stores the offset values with the samples themselves in the super-sampled sample buffer 162. In this instance, a separate sample position memory 354 may not be required.

In yet another embodiment, the graphics processor 90 stores tags to offsets with the samples themselves in the super-sampled sample buffer 162. These tags may be used to look-up the position information, such as an offset/perturbation or full position coordinates, associated with each particular sample, wherein the position information may be stored in separate memory 354. In other words, these tags may be used to index into a look-up table stored in sample position memory 354. Thus this embodiment stores look-up table tags or indices with the samples in the sample buffer 162, and these tags are accessed and used to index into the look-up table 354 to obtain the appropriate offset for the sample. Thus, this implementation would use the sample position memory 354 to store the position information (e.g., offsets).

Sample Positioning Schemes

Figure 8:
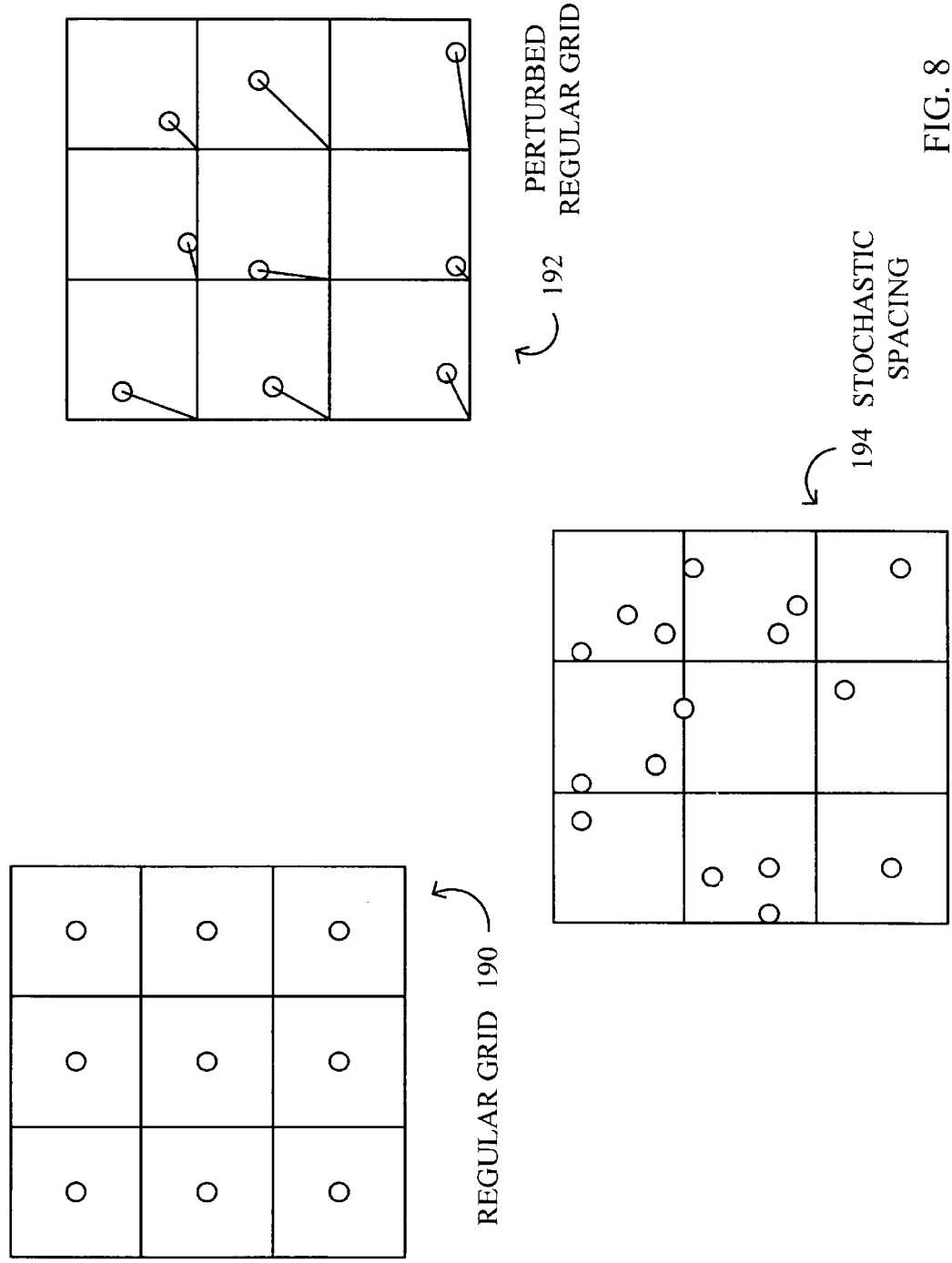
FIG. 8 illustrates details of three different embodiments of sample positioning schemes.

FIG. 8 illustrates a number of different sample positioning schemes. In regular grid positioning scheme 190, each sample is positioned at an intersection of a regularly spaced grid. Note however, that as used herein the term "regular grid" or ("pre-defined grid") is not limited to square grids. Other types of grids are also considered "regular" as the term is used herein, including, but not limited to, rectangular grids, hexagonal grids, triangular grids, logarithmic grids, and semi-regular lattices such as Penrose tiling.

Perturbed regular grid positioning scheme 192 is based upon the previous definition of a regular grid. However, the samples in perturbed regular grid scheme 192 may be offset from their corresponding grid intersection. In one embodiment, the samples may be offset by a random angle (e.g., from 0° to 360°) and a random distance or by random x and y offsets, which may or may not be limited to a predetermined range. The offsets may be generated in a number of ways, e.g., by hardware based upon a small number of seeds, looked up from a table, or by using a pseudo-random function. Once again, perturbed regular grid scheme 192 may be based on any type of regular grid (e.g., square, or hexagonal). A rectangular or hexagonal perturbed grid may be particularly desirable due to the geometric properties of these grid types.

Stochastic sample positioning scheme 194 represents a third potential type of scheme for positioning samples. Stochastic sample positioning involves randomly distributing the samples across a region (e.g., the displayed region on a display device or a particular window). Random positioning of samples may be accomplished through a number of different methods, e.g., using a random number generator such as an internal clock to generate pseudo-random numbers. Random numbers or positions may also be pre-calculated and stored in memory.

Figure 9:
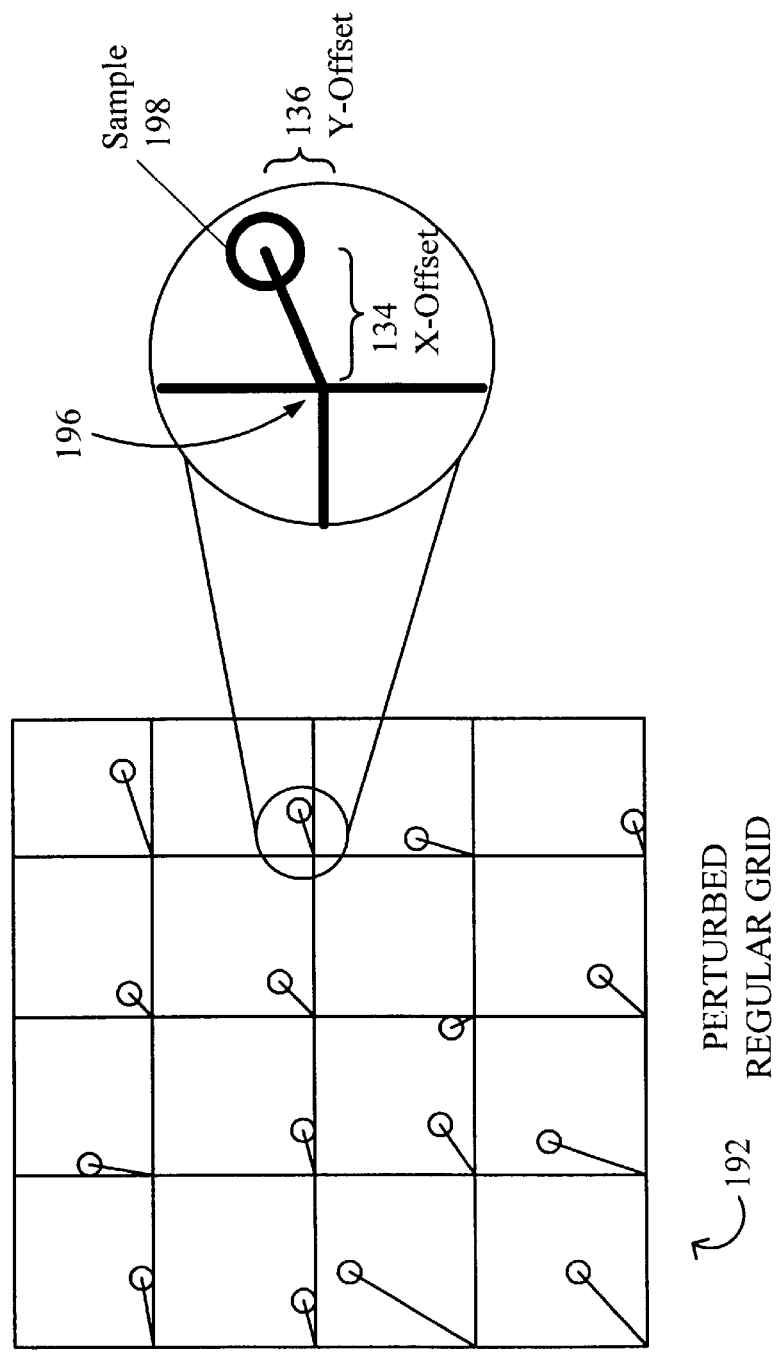
FIG. 9 illustrates details of one embodiment of a sample positioning scheme.

Turning now to FIG. 9, details of one embodiment of perturbed regular grid scheme 192 are shown. In this embodiment, samples are randomly offset from a regular square grid by x- and y-offsets. As the enlarged area shows, sample 198 has an x-offset 134 that specifies its horizontal displacement from its corresponding grid intersection point 196. Similarly, sample 198 also has a y-offset 136 that specifies its vertical displacement from grid intersection point 196. The random offset may also be specified by an angle and distance. As with the previously disclosed embodiment that utilized angles and distances, x-offset 134 and y-offset 136 may be limited to a particular minimum and or maximum value or range of values.

Figure 10:
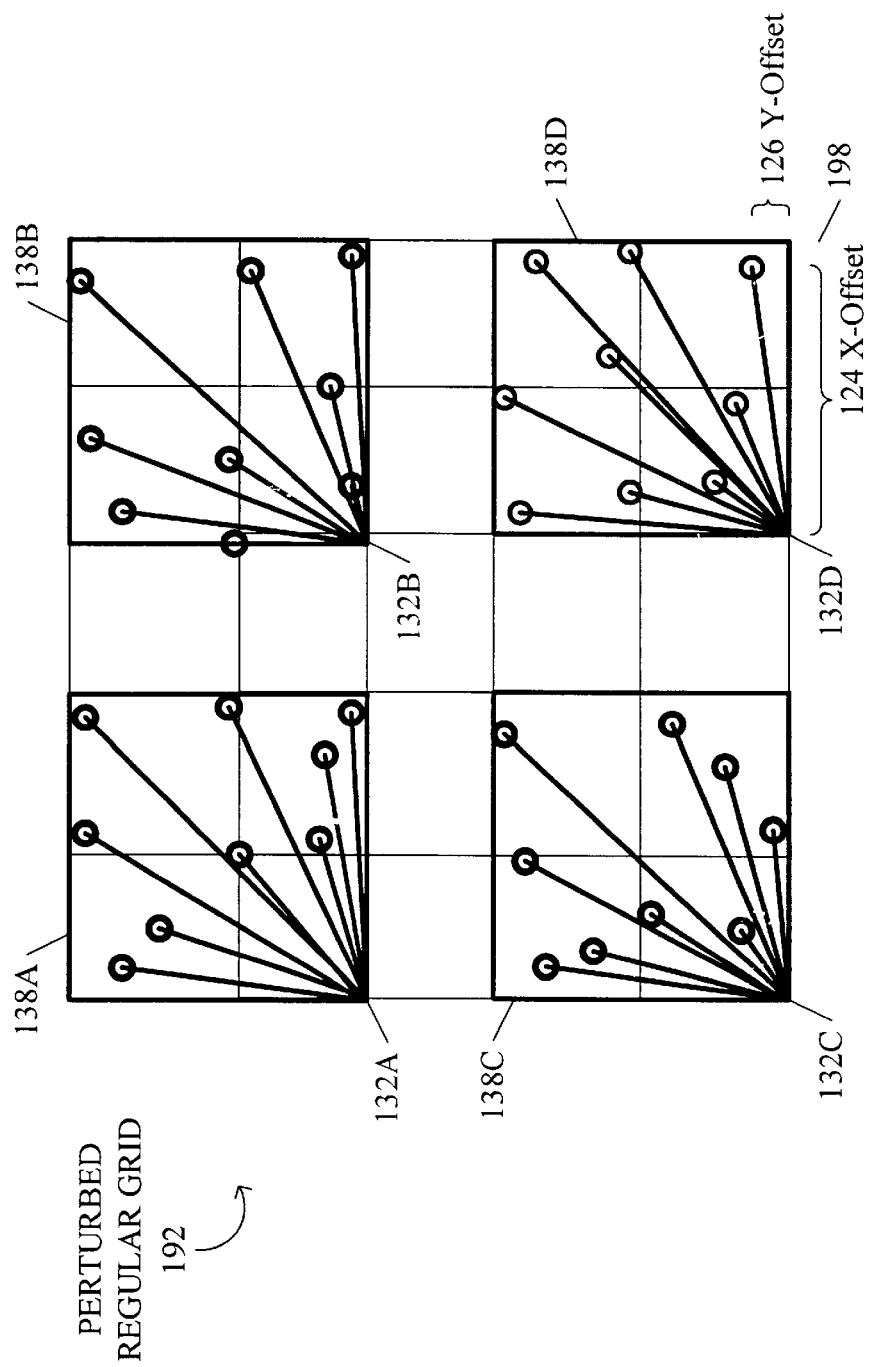
FIG. 10 illustrates details of another embodiment of a sample-positioning scheme.

Turning now to FIG. 10, details of another embodiment of perturbed regular grid scheme 192 are shown. In this embodiment, the samples are grouped into "bins" 138A–D. In this embodiment, each bin comprises nine (i.e., 3×3) samples. Different bin sizes may be used in other embodiments (e.g., bins storing 2×2 samples or 4×4 samples). In the embodiment shown, each sample's position is determined as an offset relative to the position of the bin. The position of the bins may be defined as any convenient position related to the grid, e.g., the lower left-hand corners 132A–D as shown in the figure. For example, the position of sample 198 is determined by summing x-offset 124 and y-offset 126 to the x and y coordinates of the corner 132D of bin 138D. As previously noted, this may reduce the size of the sample position memory used in some embodiments.

Figure 11:
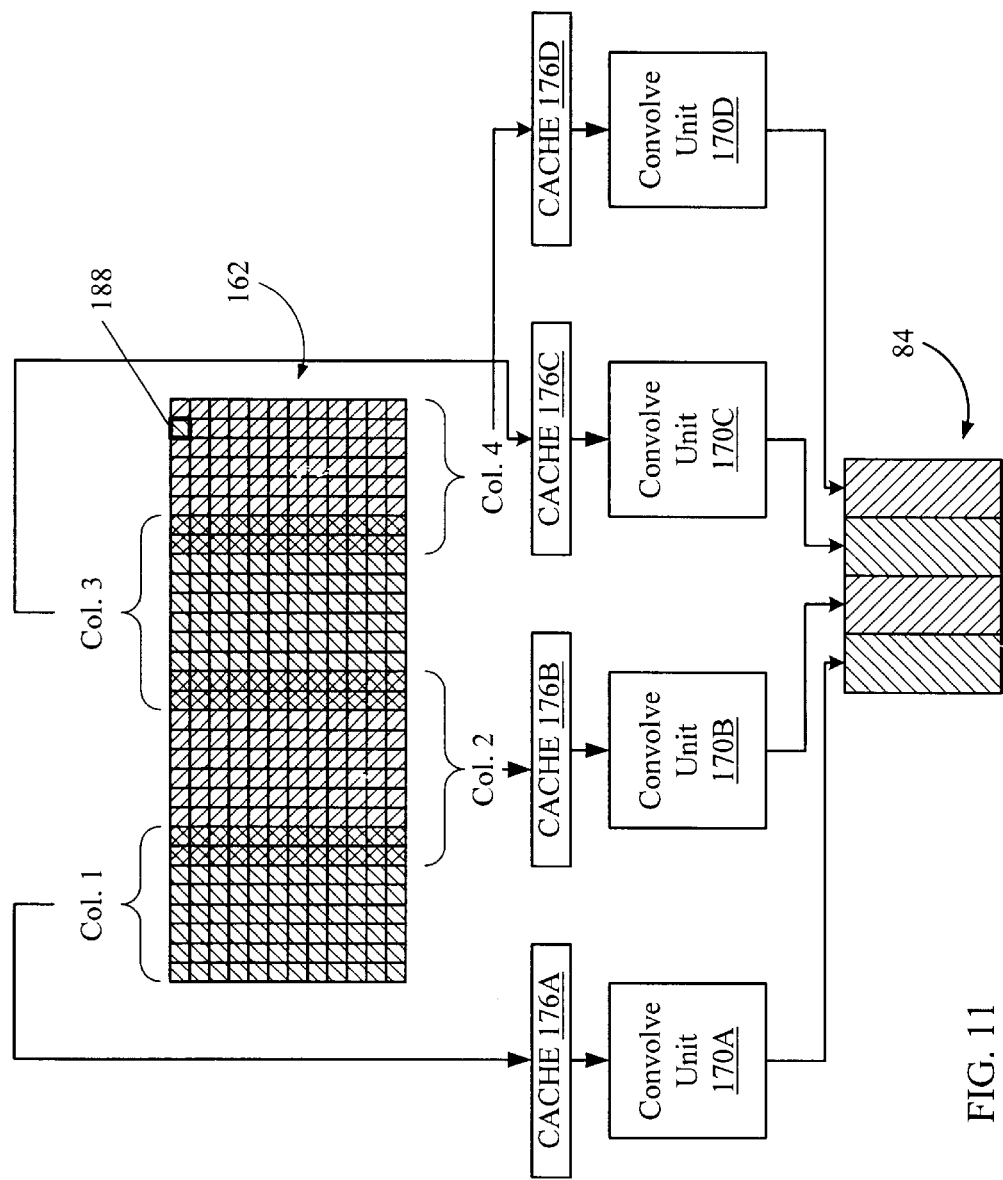
FIG. 11 illustrates details of method of converting samples to pixels in parallel.

FIG. 11—Converting Samples into Pixels

Turning now to FIG. 11, one possible method for rapidly converting samples stored in sample buffer 162 into pixels is shown. In this embodiment, the contents of sample buffer 162 are organized into columns (e.g., Cols. 1–4). Each column in sample buffer 162 may comprise a two-dimensional array of bins. The columns may be configured to horizontally overlap (e.g., by one or more bins), and each column may be assigned to a particular sample-to-pixel calculation unit 170A–D for the convolution process. The amount of the overlap may depend upon the extent of the filter being used. The example shown in the figure illustrates an overlap of two bins (each square such as square 188 represents a single bin comprising one or more samples). Advantageously, this configuration may allow sample-to-pixel calculation units 170A–D to work independently and in parallel, with each sample-to-pixel calculation unit 170A–D receiving and converting its own column. Overlapping the columns will eliminate visual bands or other artifacts appearing at the column boundaries for any operators larger than a pixel in extent.

Figure 11A:
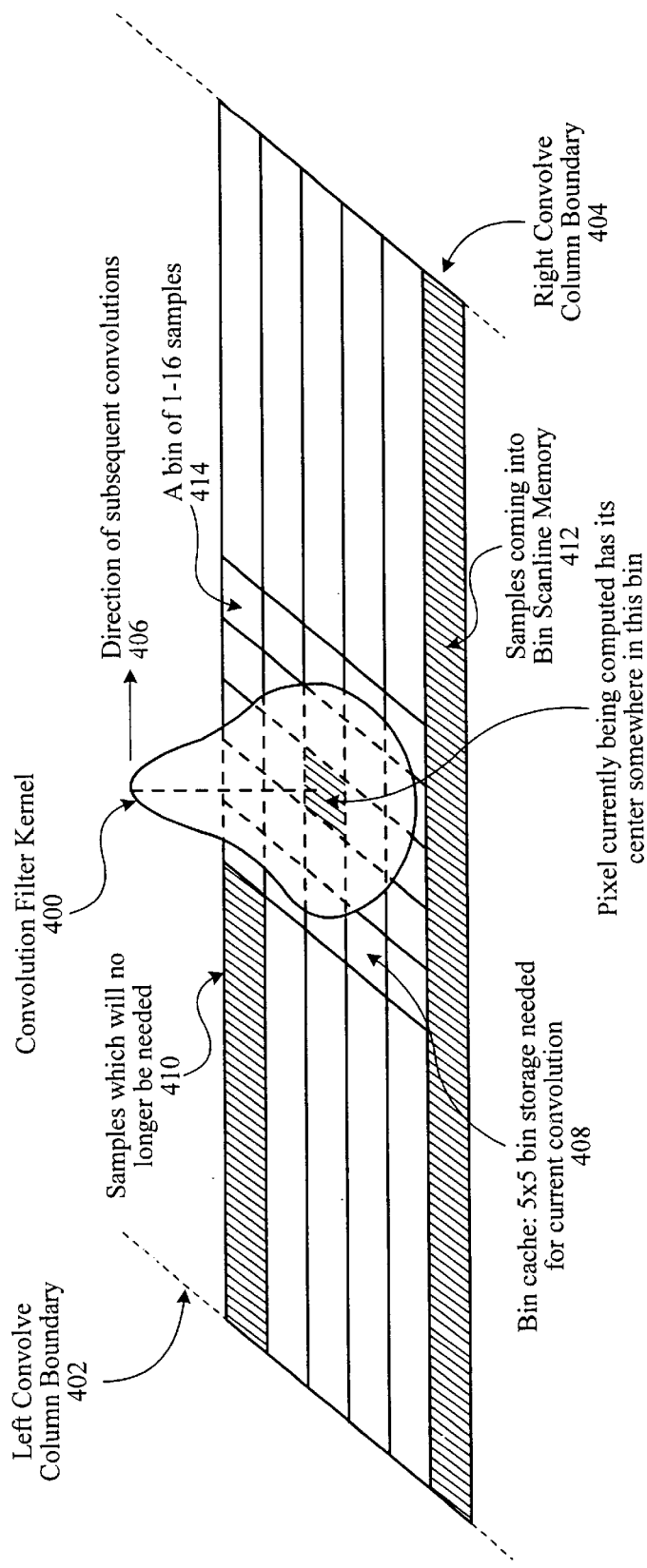
FIG. 11A illustrates more details of the embodiment from FIG. 11.

Turning now to FIG. 11A, more details of one embodiment of a method for reading the samples from a super-sampled sample buffer are shown. As the figure illustrates, the convolution filter kernel 400 travels across column 414 (see arrow 406) to generate output pixels. One or more sample-to-pixel calculation units 170 may implement the convolution filter kernel 400. A bin cache 408 may be used to provide quick access to the samples that may potentially contribute to the output pixel. As the convolution process proceeds, bins are read from the super-sampled sample buffer and stored in bin cache 408. In one embodiment, bins that are no longer needed 410 are overwritten in the cache by new bins 412. As each pixel is generated, convolution filter kernel 400 shifts. Kernel 400 may be visualized as proceeding in a sequential fashion within the column in the direction indicated by arrow 406. When kernel 400 reaches the end of the column, it may shift down one or more rows of samples and then proceed again. Thus the convolution process proceeds in a scan line manner, generating one column of output pixels for display.

Figure 11B:
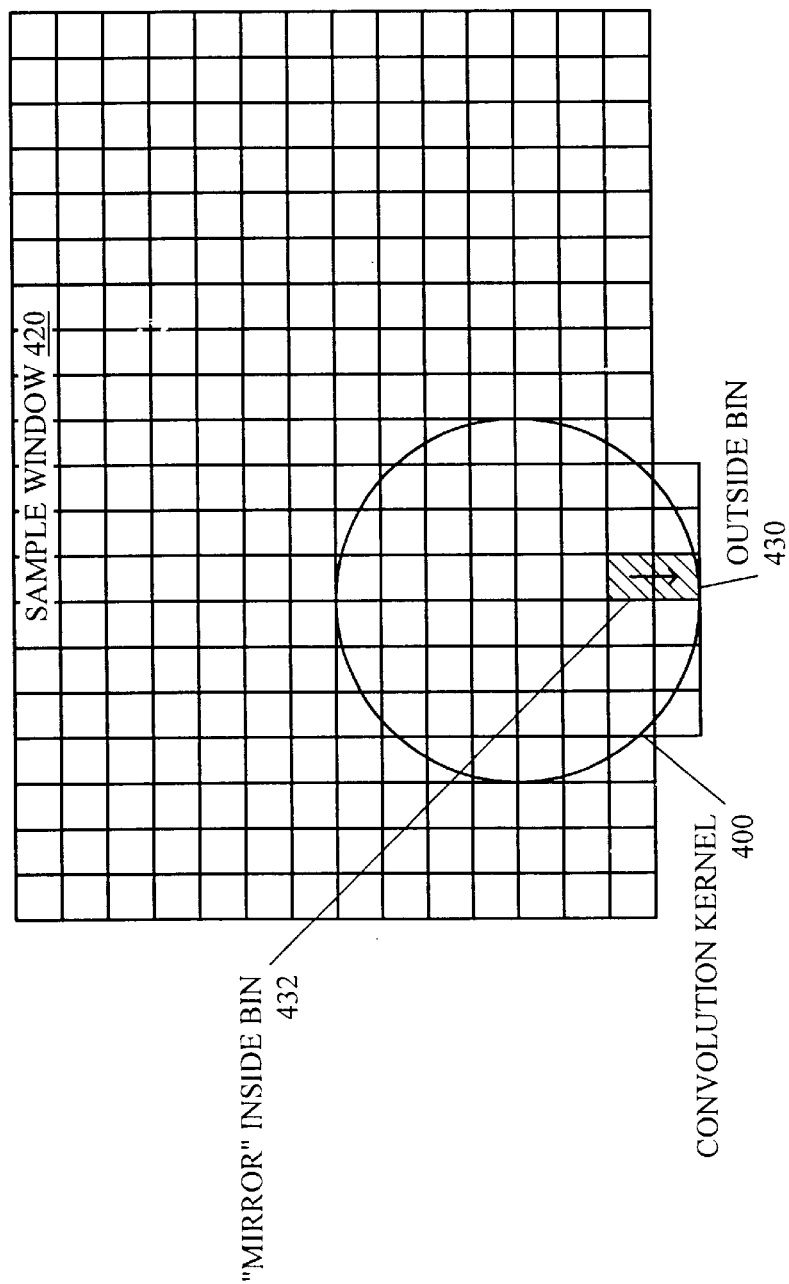
FIG. 11B illustrates details of one embodiment of a method for dealing with boundary conditions.

Turning now to FIG. 11B, a diagram illustrating potential border conditions is shown. In one embodiment, the bins that fall outside of sample window 420 may be replaced with samples having predetermined background colors specified by the user. In another embodiment, bins that fall outside the window are not used by setting their weighting factors to zero (and then dynamically calculating normalization coefficients). In yet another embodiment, the bins at the inside edge of the window may be duplicated to replace those outside the window. This is indicated by outside bin 430 being replaced by mirror inside bin 432.

Figure 12:
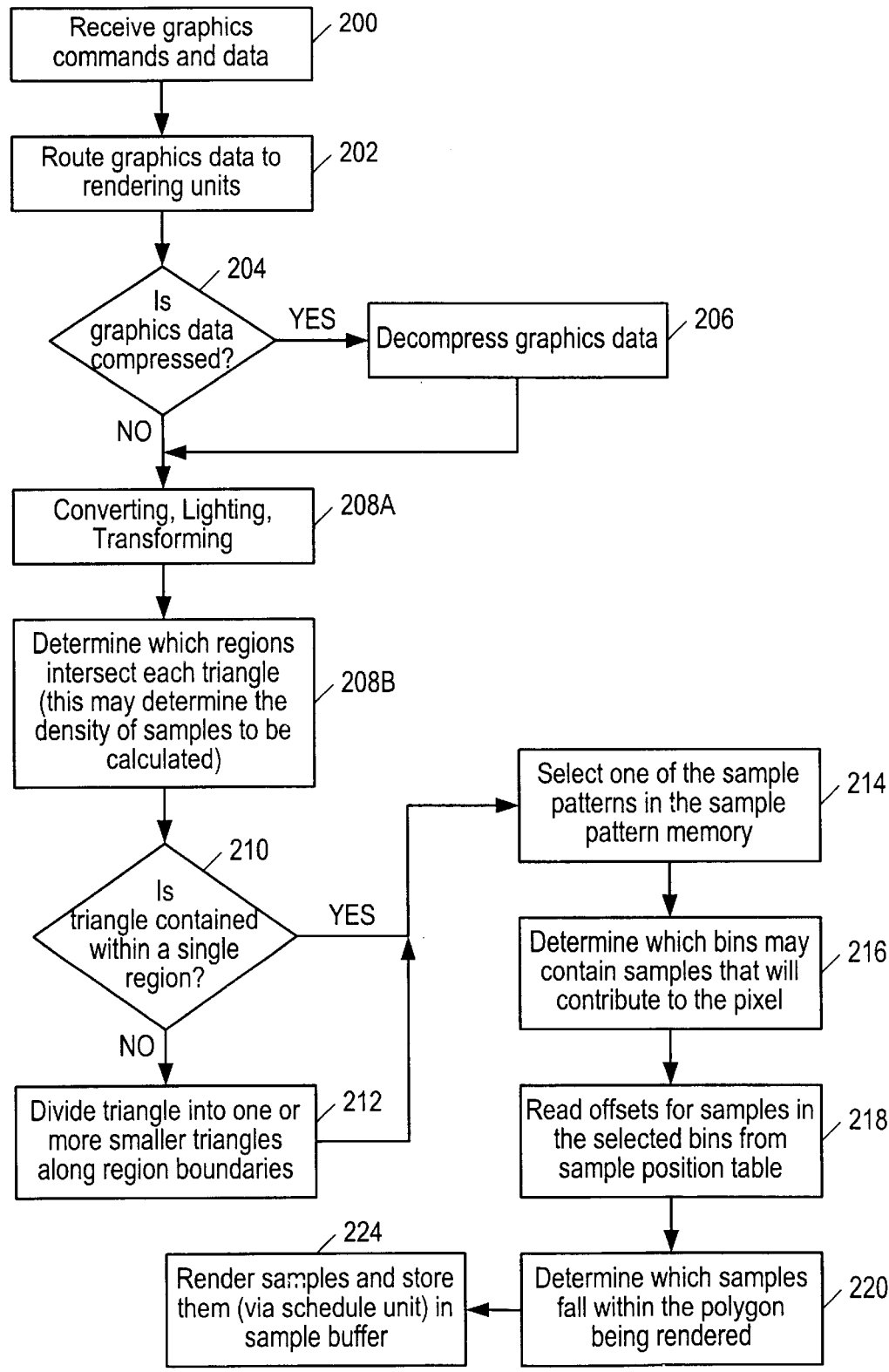
FIG. 12 is a flowchart illustrating one embodiment of a method for drawing samples into a super-sampled sample buffer.

FIG. 12—Rendering Sample Pixels into a Super-Sampled Sample Buffer

FIG. 12 is a flowchart of one embodiment of a method for drawing or rendering sample pixels into a super-sampled sample buffer. Certain of the steps of FIG. 12 may occur concurrently or in different orders. In this embodiment, the graphics system receives graphics commands and graphics data from the host CPU 102 or directly from main memory 106 (step 200). Next, the instructions and data are routed to one or more rendering units 150A–D (step 202). If the graphics data is compressed (step 204), then the rendering units 150A–D decompress the data into a useable format, e.g., triangles (step 206). Next, the triangles are processed, e.g., converted to screen space, lit, and transformed (step 208A). If the graphics system implements variable resolution super sampling, then the triangles are compared with the sample density region boundaries (step 208B). In variable-resolution super-sampled sample buffer implementations, different regions of the display device may be allocated different sample densities based upon a number of factors (e.g., the center of the attention on the screen as determined by eye or head tracking). Sample density regions are described in greater detail below (see section entitled Variable Resolution Sample buffer below). If the triangle crosses a region boundary (step 210), then the triangle may be divided into two smaller polygons along the region boundary (step 212). This may allow each newly formed triangle to have a single sample density. In one embodiment, the graphics system may be configured to simply use the entire triangle twice (i.e., once in each region) and then use a bounding box to effectively clip the triangle.

Next, one of the sample position schemes (e.g., regular grid, perturbed regular grid, or stochastic) are selected from the sample position memory 184 (step 214). The sample position scheme will generally have been pre-programmed into the sample position memory 184, but may also be selected "on the fly". Based upon this sample position scheme and the sample density of the region containing the triangle, rendering units 150A–D determine which bins may contain samples located within the triangle's boundaries (step 216). The offsets for the samples within these bins are then read from sample position memory 184 (step 218). Each sample's position is then calculated using the offsets and is compared with the triangle's vertices to determine if the sample is within the triangle (step 220). Step 220 is discussed in greater detail below.

For each sample that is determined to be within the triangle, the rendering unit draws the sample by calculating the sample's color, alpha and other attributes. This may involve lighting calculation and interpolation based upon the color and texture map information associated with the vertices of the triangle. Once the sample is rendered, it may be forwarded to schedule unit 154, which then stores the sample in sample buffer 162 (step 224).

Note the embodiment of the method described above is used for explanatory purposes only and is not meant to be limiting. For example, in some embodiments the steps shown in the figure as occurring serially may be implemented in parallel. Furthermore, some steps may be reduced or eliminated in certain embodiments of the graphics system (e.g., steps 204–206 in embodiments that do not implement geometry compression or steps 210–212 in embodiments that do not implement a variable resolution super-sampled sample buffer).

Determination of Which Samples Reside Within the Polygon Being Rendered

The comparison of which samples reside within the polygon being rendered may be performed in a number of different ways. In one embodiment, the deltas between the three vertices defining the triangle are first determined. For example, these deltas may be taken in the order of first to second vertex (v2−v1)=d12, second to third vertex (v3−v2)=d23, and third vertex back to the first vertex (v1−v3)=d31. These deltas form vectors, and each vector may be categorized as belonging to one of the four quadrants of the coordinate plane (e.g., by using the two sign bits of its delta X and Y coefficients). A third condition may be added determining whether the vector is an X-major vector or Y-major vector. This may be determined by calculating whether abs(delta_x) is greater than abs(delta_y).

Figure 12A:
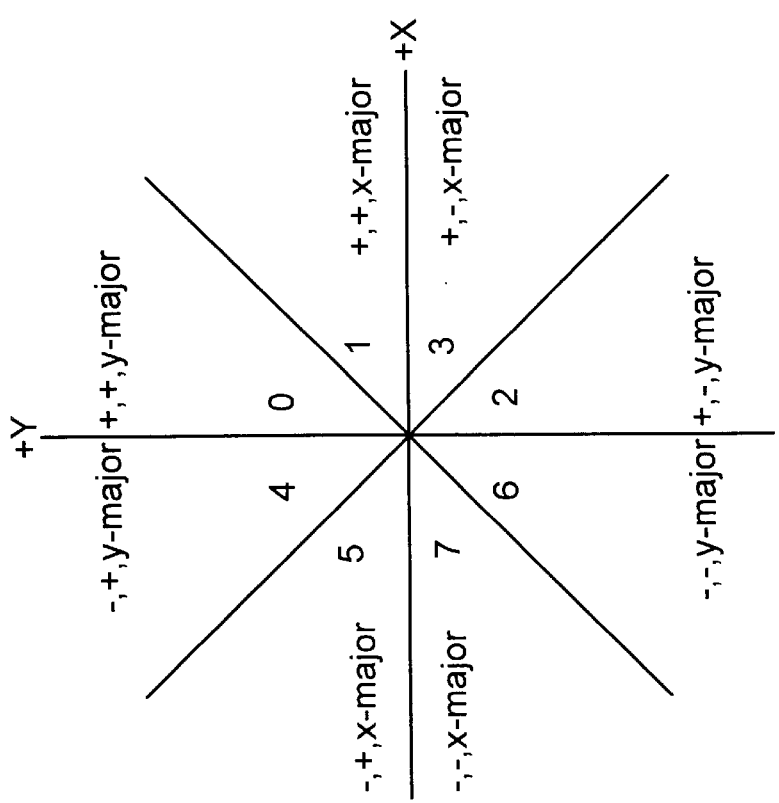
FIG. 12A illustrates one embodiment for coding triangle vertices.

Using these three bits of information, the vectors may each be categorized as belonging to one of eight different regions of the coordinate plane. If three bits are used to define these regions, then the X-sign bit (shifted left by two), the Y-sign bit (shifted left by one), and the X-major bit, may be used to create the eight regions as shown in FIG. 12A.

Next, three edge equations may be used to define the inside portion of the triangle. These edge equations (or half-plane equations) may be defined using slope-intercept form. To reduce the numerical range needed, both X-major and Y-major equation forms may be used (such that the absolute value of the slope value may be in the range of 0 to 1). Thus, the two edge equations are:

X-major: $y-m \cdot x-b<0$, when the point is below the line

Y-major: $x-m \cdot y-b<0$, when the point is to the left of the line

The X-major equations produces a negative versus positive value when the point in question is below the line, while the Y-major equation produces a negative versus positive value when the point in question is to the left of the line. Since which side of the line is the "accept" side is known, the sign bit (or the inverse of the sign bit) of the edge equation result may be used to determine whether the sample is on the "accept" side or not. This is referred to herein as the "accept bit". Thus, a sample is on the accept side of a line if:

X-major: $(y-m \cdot x-b<0)<\text{xor}>\text{accept}$

Y-major: $(x-m \cdot y-b<0)<\text{xor}>\text{accept}$

The accept bit may be calculated according to the following table, wherein cw designates whether the triangle is clockwise (cw=1) or counter-clockwise (cw=0):

1: accept=!cw
0: accept=cw
4: ccept=cw
5: accept=cw
7: accept=cw
6: accept=!cw
2: accept=!cw
3: accept=!cw Tie breaking rules for this representation may also be implemented (e.g., coordinate axes may be defined as belonging to the positive octant). Similarly, X-major may be defined as owning all points that tie on the slopes.

In an alternate embodiment, the accept side of an edge may be determined by applying the edge equation to the third vertex of the triangle (the vertex that is not one of the two vertices forming the edge). This method may incur the additional cost of a multiply-add, which may not be used by the technique described above.

To determine the "faced-ness" of a triangle (i.e., whether the triangle is clockwise or counter-clockwise), the delta-directions of two edges of the triangle may be checked and the slopes of the two edges may be compared. For example, assuming that edge12 has a delta-direction of 1 and the second edge (edge23) has a delta-direction of 0, 4, or 5, then the triangle is counter-clockwise. If, however, edge23 has a delta-direction of 3, 2, or 6, then the triangle is clockwise. If edge23 has a delta-direction of 1 (i.e., the same as edge12), then comparing the slopes of the two edges breaks the tie (both are x-major). If edge12 has a greater slope, then the triangle is counter-clockwise. If edge23 has a delta-direction of 7 (the exact opposite of edge12), then again the slopes are compared, but with opposite results in terms of whether the triangle is clockwise or counter-clockwise.

The same analysis can be exhaustively applied to all combinations of edge12 and edge23 delta-directions, in every case determining the proper faced-ness. If the slopes are the same in the tie case, then the triangle is degenerate (i.e., with no interior area). It can be explicitly tested for and culled, or, with proper numerical care, it could be let through as it will cause no pixels to render. One special case is when a triangle splits the view plane, but that may be detected earlier in the pipeline (e.g., when front plane and back plane clipping are performed).

Note in most cases only one side of a triangle is rendered. Thus, after the faced-ness of a triangle is determined, if the face is the one to be rejected, the triangle can be culled (i.e., subject to no further processing with no pixels generated). Further, note that this determination of faced-ness only uses one additional comparison (i.e., of the slope of edge12 to that of edge23) beyond factors already computed. Many traditional approaches may utilize more complex computation (though at earlier stages of the set-up computation).

Figure 13:
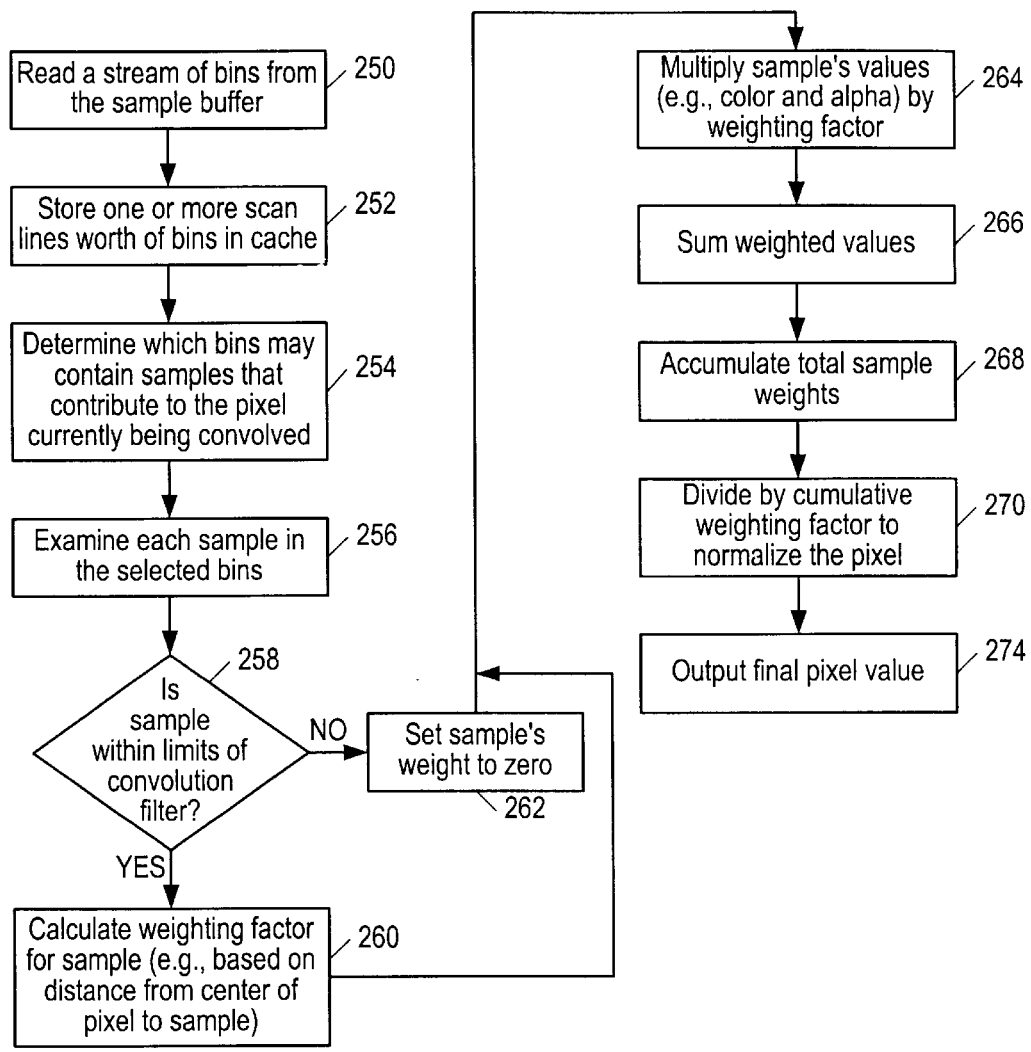
FIG. 13 illustrates one embodiment of a method for calculating pixels from samples.

FIG. 13—Generating Output Pixels by Selecting and Filtering Samples in the Super-Sampled Sample Buffer FIG. 13 is a flowchart of one embodiment of a method for selecting and filtering samples stored in the super-sampled sample buffer to generate output pixels. First, a stream of bins are read from the super-sampled sample buffer (step 250). These may be stored in one or more caches to allow the sample-to-pixel calculation units 170 easy access during the convolution process (step 252). Next, the bins are examined to determine which may contain samples that contribute to the output pixel currently being generated by the filter process (step 254). Each sample that is in a bin that may contribute to the output pixel is then individually examined to determine if the sample does indeed contribute (steps 256–258). This determination may be based upon the distance from the sample to the center of the output pixel being generated.

In one embodiment, the sample-to-pixel calculation units 170 may be configured to calculate this distance (i.e., the extent of the filter at sample's position) and then use it to index into a table storing filter weight values according to filter extent (step 260). In another embodiment, however, the potentially expensive calculation for determining the distance from the center of the pixel to the sample (which typically involves a square root function) is avoided by using distance squared to index into the table of filter weights. Alternatively, a function of x and y may be used in lieu of one dependent upon a distance calculation. In one embodiment, this may be accomplished by utilizing a floating point format for the distance (e.g., four or five bits of mantissa and three bits of exponent), thereby allowing much of the accuracy to be maintained while compensating for the increased range in values. In one embodiment, the table may be implemented in ROM. However, RAM tables may also be used. Advantageously, RAM tables may, in some embodiments, allow the graphics system to vary the filter coefficients on a per-frame basis. For example, the filter coefficients may be varied to compensate for known shortcomings of the display or for the user's personal preferences. The graphics system can also vary the filter coefficients on a screen area basis within a frame, or on a per-output pixel basis. Another alternative embodiment may actually calculate the desired filter weights for each sample using specialized hardware (e.g., multipliers and adders). The filter weight for samples outside the limits of the convolution filter may simply be multiplied by a filter weight of zero (step 262), or they may be removed from the calculation entirely.

Once the filter weight for a sample has been determined, the sample may then be multiplied by its filter weight (step 264). The weighted sample may then be summed with a running total to determine the final output pixel's color value (step 266). The filter weight may also be added to a running total pixel filter weight (step 268), which is used to normalize the filtered pixels. Normalization advantageously prevents the filtered pixels (e.g., pixels with more samples than other pixels) from appearing too bright or too dark by compensating for gain introduced by the convolution process. After all the contributing samples have been weighted and summed, the total pixel filter weight may be used to divide out the gain caused by the filtering (step 270). Finally, the normalized output pixel may be output for gamma correction, digital-to-analog conversion (if necessary), and eventual display (step 274).

Figure 14:
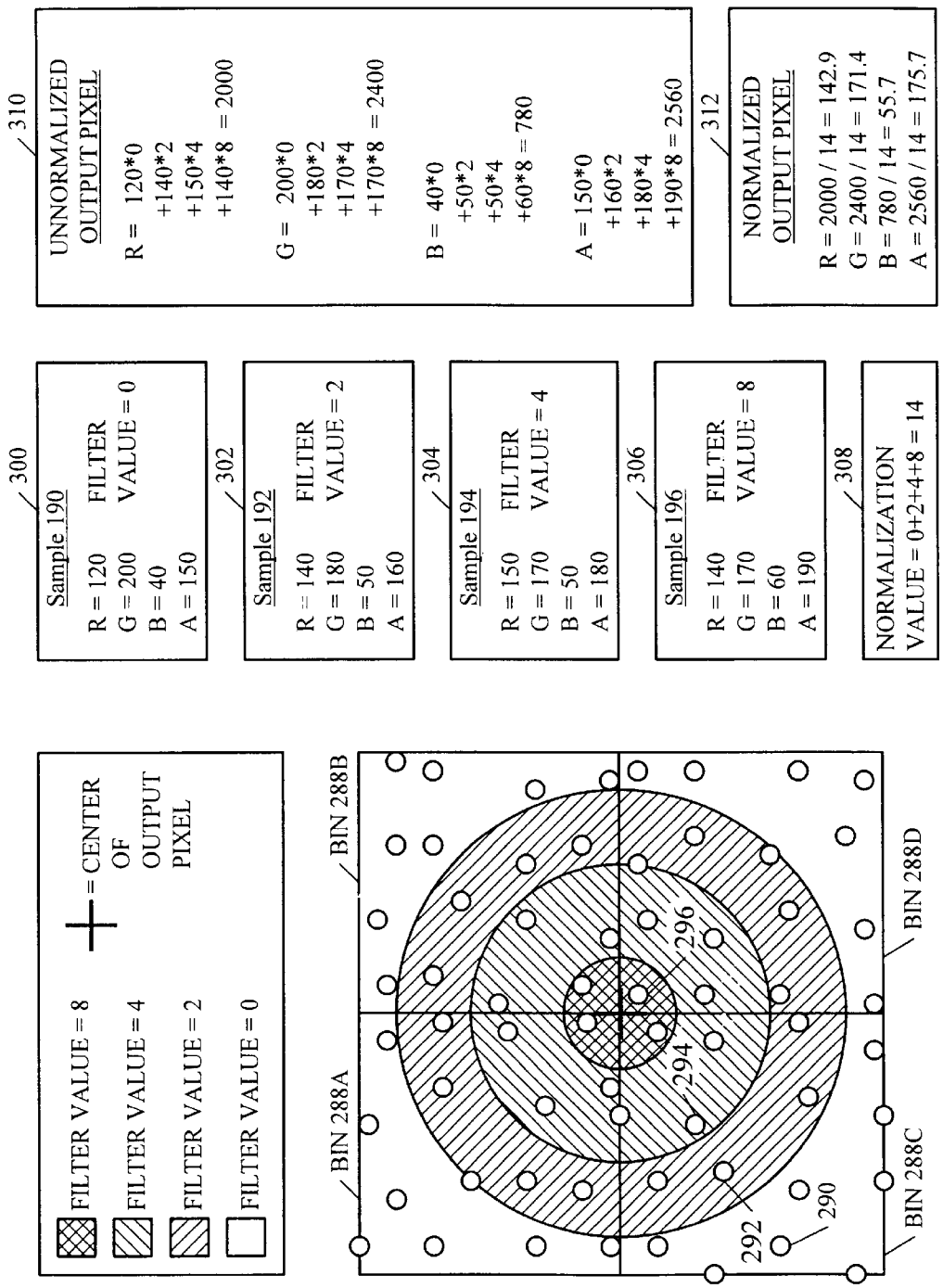
FIG. 14 illustrates details of one embodiment of a pixel convolution for an example set of samples.

FIG. 14—Example Output Pixel Convolution

FIG. 14 illustrates a simplified example of an output pixel convolution. As the figure shows, four bins 288A–D contain samples that may possibly contribute to the output pixel. In this example, the center of the output pixel, i.e., the center location where the filter is applied to generate a respective output pixel, is located at the boundary of bins 288A–288D. Each bin comprises sixteen samples, and an array of 2 four bins (2×2) is filtered to generate the output pixel. Assuming circular filters are used, the distance of each sample from the pixel center determines which filter value will be applied to the sample. For example, sample 296 is relatively close to the pixel center, and thus falls within the region of the filter having a filter value of 8. Similarly, samples 294 and 292 fall within the regions of the filter having filter values of 4 and 2, respectively. Sample 290, however, falls outside the maximum filter extent, and thus receives a filter value of 0. Thus sample 290 will not contribute to the output pixel's value. This type of filter ensures that the samples located the closest to the pixel center will contribute the most, while pixels located the far from the pixel center will contribute less to the final output pixel values. This type of filtering automatically performs anti-aliasing by smoothing any abrupt changes in the image (e.g., from a dark line to a light background). Another particularly useful type of filter for anti-aliasing is a windowed sinc filter. Advantageously, the windowed sinc filter contains negative lobes that resharpen some of the blended or "fuzzed" image. Negative lobes are areas where the filter causes the samples to subtract from the pixel being calculated. In contrast, samples on either side of the negative lobe add to the pixel being calculated.

Example values for samples 290–296 are illustrated in boxes 300–308. In this example, each sample comprises red, green, blue, and alpha values, in addition to the sample's positional data. Block 310 illustrates the calculation of each pixel component value for the non-normalized output pixel. As block 310 indicates, potentially undesirable gain is introduced into the final pixel values (i.e., an out pixel having a red component value of 2000 is much higher than any of the sample's red component values). As previously noted, the filter values may be summed to obtain normalization value 308. Normalization value 308 is used to divide out the unwanted gain from the output pixel. Block 312 illustrates this process and the final normalized example pixel values.

Note the values used herein were chosen for descriptive purposes only and are not meant to be limiting. For example, the filter may have a large number of regions each with a different filter value. In one embodiment, some regions may have negative filter values. The filter utilized may be a continuous function that is evaluated for each sample based on the sample's distance from the pixel center. Also, note that floating point values may be used for increased precision. A variety of filters may be utilized, e.g., cylinder, cone, gaussian, Katmull-Rom, windowed sinc, Mitchell filter, box, tent.

Full-Screen Anti-aliasing

The vast majority of current 3D graphics systems only provide real-time anti-aliasing for lines and dots. While some systems also allow the edge of a polygon to be "fuzzed", this technique typically works best when all polygons have been pre-sorted in depth. This may defeat the purpose of having general-purpose 3D rendering hardware for most applications (which do not depth pre-sort their polygons). In one embodiment, graphics system 112 may be configured to implement full-screen anti-aliasing by stochastically sampling up to sixteen samples per output pixel, filtered by a 4×4 convolution filter.

Variable Resolution Super-Sampling

Currently, the straight-forward brute force method of utilizing a fixed number of samples per pixel location, e.g., an 8× super-sampled sample buffer, would entail the use of eight times more memory, eight times the fill rate (i.e., memory bandwidth), and a convolution pipe capable of processing eight samples per pixel. Given the high resolution and refresh rates of current displays, a graphics system of this magnitude may be relatively expense to implement given today's level of integration.

In one embodiment, graphics system 112 may be configured to overcome these potential obstacles by implementing variable resolution super-sampling. In this embodiment, graphics system 112 mimics the human eye's characteristics by allocating a higher number of samples per pixel at one or more first locations on the screen (e.g., the point of foveation on the screen), with a drop-off in the number of samples per pixel for one or more second locations on the screen (e.g., areas farther away from the point of foveation). Depending upon the implementation, the point of foveation may be determined in a variety of ways. In one embodiment, the point of foveation may be a predetermined area around a certain object displayed upon the screen. For example, the area around a moving cursor or the main character in a computer game may be designated the point of foveation. In another embodiment, the point of foveation on the screen may be determined by head-tracking or eye-tracking. Even if eye/head/hand-tracking, cursor-based, or main character-based points of foveation are not implemented, the point of foveation may be fixed at the center of the screen, where the majority of viewer's attention is focused the majority of the time. Variable resolution super-sampling is described in greater detail below.

Variable-Resolution Super-Sampled Sample Buffer—FIGS. 15–19

A traditional frame buffer is one rectangular array of uniformly sampled pixels. For every pixel on the final display device (CRT or LCD), there is a single pixel or location of memory storage in the frame buffer (perhaps double buffered). There is a trivial one-to-one correspondence between the 2D memory address of a given pixel and its 2D sample address for the mathematics of rendering. Stated another way, in a traditional frame buffer there is no separate notion of samples apart from the pixels themselves. The output pixels are stored in a traditional frame buffer in a row/column manner corresponding to how the pixels are provided to the display during display refresh.

In a variable-resolution super-sampled sample buffer, the number of computed samples per output pixel varies on a regional basis. Thus, output pixels in regions of greater interest are computed using a greater number of samples, thus producing greater resolution in this region, and output pixels in regions of lesser interest are computed using a lesser number of samples, thus producing lesser resolution in this region.

As previously noted, in some embodiments graphic system 112 may be configured with a variable resolution super-sampled sample buffer. To implement variable resolution super-sampling, sample buffer 162 may be divided into smaller pieces, called regions. The size, location, and other attributes of these regions may be configured to vary dynamically, as parameterized by run-time registers on a per-frame basis.

Figure 15:
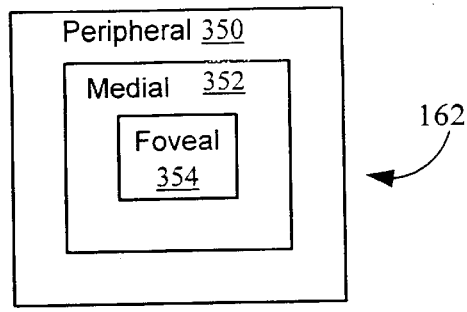
FIG. 15 illustrates one embodiment of a method for dividing a super-sampled sample buffer into regions.

Turning now to FIG. 15, a diagram of one possible scheme for dividing sample buffer 162 is shown. In this embodiment, sample buffer 162 is divided into the following three nested regions: foveal region 354, medial region 352, and peripheral region 350. Each of these regions has a rectangular shaped outer border, but the medial and the peripheral regions have a rectangular shaped hole in their center. Each region may be configured with certain constant (per frame) properties, e.g., a constant density sample density and a constant size of pixel bin. In one embodiment, the total density range may be 256, i.e., a region could support between one sample every 16 screen pixels (4×4) and 16 samples for every 1 screen pixel. In other embodiments, the total density range may be limited to other values, e.g., 64.

In one embodiment, the sample density varies, either linearly or non-linearly, across a respective region. Note in other embodiments the display may be divided into a plurality of constant sized regions (e.g., squares that are 4×4 pixels in size or 40×40 pixels in size).

Figure 16:
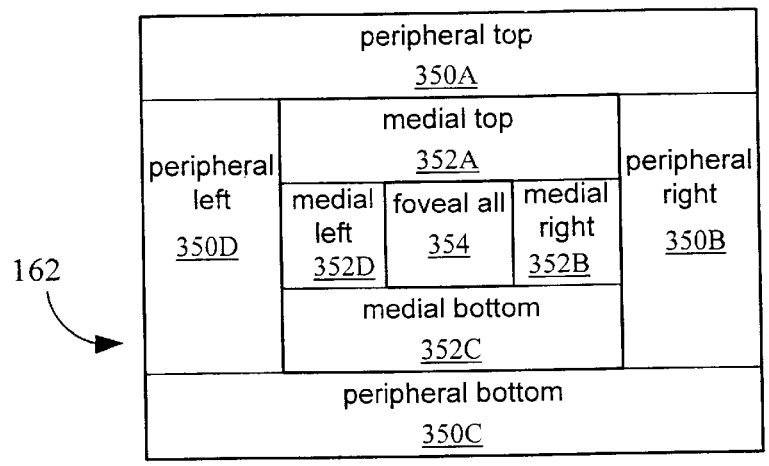
FIG. 16 illustrates another embodiment of a method for dividing a super-sampled sample buffer into regions.

To simply perform calculations for polygons that encompass one or more region corners (e.g., a foveal region corner), the sample buffer may be further divided into a plurality of subregions. Turning now to FIG. 16, one embodiment of sample buffer 162 divided into sub-regions is shown. Each of these sub-regions are rectangular, allowing graphics system 112 to translate from a 2D address with a sub-region to a linear address in sample buffer 162. Thus, in some embodiments each sub-region has a memory base address, indicating where storage for the pixels within the sub-region starts. Each sub-region may also have a "stride" parameter associated with its width.

Figure 17:
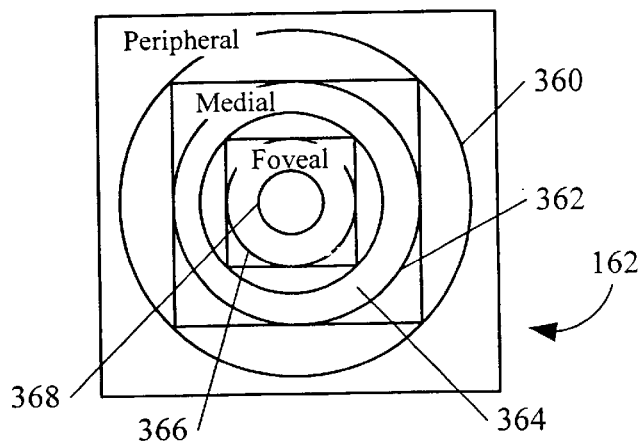
FIG. 17 illustrates yet another embodiment of a method for dividing a super-sampled sample buffer into regions.

Another potential division of the super-sampled sample buffer is circular. Turning now to FIG. 17, one such embodiment is illustrated. For example, each region may have two radii associated with it (i.e., 360–368), dividing the region into three concentric circular-regions. The circular-regions may all be centered at the same screen point, the fovea center point. Note however, that the fovea center-point need not always be located at the center of the foveal region. In some instances, it may even be located off-screen (i.e., to the side of the visual display surface of the display device). While the embodiment illustrated supports up to seven distinct circular-regions, it is possible for some of the circles to be shared across two different regions, thereby reducing the distinct circular-regions to five or less.

The circular regions may delineate areas of constant sample density actually used. For example, in the example illustrated in the figure, foveal region 354 may allocate a sample buffer density of 8 samples per screen pixel, but outside the innermost circle 368, it may only use 4 samples per pixel, and outside the next circle 366 it may only use two samples per pixel. Thus, in this embodiment, the rings need not necessarily save actual memory (the regions do that), but they may potentially save memory bandwidth into and out of the sample buffer (as well as pixel convolution bandwidth). In addition to indicating a different effective sample density, the rings may also be used to indicate a different sample position scheme to be employed. As previously noted, these sample position schemes may be stored in an on-chip RAM/ROM, or in programmable memory.

As previously discussed, in some embodiments super-sampled sample buffer 162 may be further divided into bins. For example, a bin may store a single sample or an array of samples (e.g., 2×2 or 4×4 samples). In one embodiment, each bin may store between one and sixteen sample points, although other configurations are possible and contemplated. Each region may be configured with a particular bin size, and a constant memory sample density as well. Note that the lower density regions need not necessarily have larger bin sizes. In one embodiment, the regions (or at least the inner regions) are exact integer multiples of the bin size enclosing the region. This may allow for more efficient utilization of the sample buffer in some embodiments.

Variable-resolution super-sampling involves calculating a variable number of samples for each pixel displayed on the display device. Certain areas of an image may benefit from a greater number of samples (e.g., near object edges), while other areas may not need extra samples (e.g., smooth areas having a constant color and brightness). To save memory and bandwidth, extra samples may be used only in areas that may benefit from the increased resolution. For example, if part of the display is colored a constant color of blue (e.g., as in a background), then extra samples may not be particularly useful because they will all simply have the constant value (equal to the background color being displayed). In contrast, if a second area on the screen is displaying a 3D rendered object with complex textures and edges, the use of additional samples may be useful in avoiding certain artifacts such as aliasing. A number of different methods may be used to determine or predict which areas of an image would benefit from higher sample densities. For example, an edge analysis could be performed on the final image, and with that information being used to predict how the sample densities should be distributed. The software application may also be able to indicate which areas of a frame should be allocated higher sample densities.

A number of different methods may be used to implement variable-resolution super sampling. These methods tend to fall into the following two general categories: (1) those methods that concern the draw or rendering process, and (2) those methods that concern the convolution process. For example, samples may be rendered into the super-sampling sample buffer 162 using any of the following methods:

1) a uniform sample density;
2) varying sample density on a per-region basis (e.g., medial, foveal, and peripheral); and
3) varying sample density by changing density on a scan-line basis (or on a small number of scan lines basis).

Varying sample density on a scan-line basis may be accomplished by using a look-up table of densities. For example, the table may specify that the first five pixels of a particular scan line have three samples each, while the next four pixels have two samples each, and so on.

On the convolution side, the following methods are possible:

1) a uniform convolution filter;
2) continuously variable convolution filter; and
3) a convolution filter operating at multiple spatial frequencies.

A uniform convolve filter may, for example, have a constant extent (or number of samples selected) for each pixel calculated. In contrast, a continuously variable convolution filter may gradually change the number of samples used to calculate a pixel. The function may be varied continuously from a maximum at the center of attention to a minimum in peripheral areas.

Different combinations of these methods (both on the rendering side and convolution side) are also possible. For example, a constant sample density may be used on the rendering side, while a continuously variable convolution filter may be used on the samples.

Different methods for determining which areas of the image will be allocated more samples per pixel are also contemplated. In one embodiment, if the image on the screen has a main focal point (e.g., a character like Mario in a computer game), then more samples may be calculated for the area around Mario and fewer samples may be calculated for pixels in other areas (e.g., around the background or near the edges of the screen).

In another embodiment, the viewer's point of foveation may be determined by eye/head/hand-tracking. In head-tracking embodiments, the direction of the viewer's gaze is determined or estimated from the orientation of the viewer's head, which may be measured using a variety of mechanisms. For example, a helmet or visor worn by the viewer (with eye/head tracking) may be used alone or in combination with a hand-tracking mechanism, wand, or eye-tracking sensor to provide orientation information to graphics system 112. Other alternatives include head-tracking using an infrared reflective dot placed on the user's forehead, or using a pair of glasses with head- and or eye-tracking sensors built in. One method for using head- and hand-tracking is disclosed in U.S. Pat. No. 5,446,834 (entitled "Method and Apparatus for High Resolution Virtual Reality Systems Using Head Tracked Display," by Michael Deering, issued Aug. 29, 1995), which is incorporated herein by reference in its entirety. Other methods for head tracking are also possible and contemplated (e.g., infrared sensors, electromagnetic sensors, capacitive sensors, video cameras, sonic and ultrasonic detectors, clothing based sensors, video tracking devices, conductive ink, strain gauges, force-feedback detectors, fiber optic sensors, pneumatic sensors, magnetic tracking devices, and mechanical switches).

As previously noted, eye-tracking may be particularly advantageous when used in conjunction with head-tracking. In eye-tracked embodiments, the direction of the viewer's gaze is measured directly by detecting the orientation of the viewer's eyes in relation to the viewer's head. This information, when combined with other information regarding the position and orientation of the viewer's head in relation to the display device, may allow an accurate measurement of viewer's point of foveation (or points of foveation if two eye-tracking sensors are used). One possible method for eye tracking is disclosed in U.S. Pat. No. 5,638,176 (entitled "Inexpensive Interferometric Eye Tracking System"). Other methods for eye tracking are also possible and contemplated (e.g., the methods for head tracking listed above).

Regardless of which method is used, as the viewer's point of foveation changes position, so does the distribution of samples. For example, if the viewer's gaze is focused on the upper left-hand corner of the screen, the pixels corresponding to the upper left-hand corner of the screen may each be allocated eight or sixteen samples, while the pixels in the opposite corner (i.e., the lower right-hand corner of the screen) may be allocated only one or two samples per pixel. Once the viewer's gaze changes, so does the allotment of samples per pixel. When the viewer's gaze moves to the lower right-hand corner of the screen, the pixels in the upper left-hand corner of the screen may be allocated only one or two samples per pixel. Thus, the number of samples per pixel may be actively changed for different regions of the screen in relation the viewer's point of foveation. Note in some embodiments, multiple users may be each has head/eye/hand tracking mechanisms that provide input to graphics system 112. In these embodiments, there may conceivably be two or more points of foveation on the screen, with corresponding areas of high and low sample densities. As previously noted, these sample densities may affect the render process only, the filter process only, or both processes.

Figures 18A, 18B:
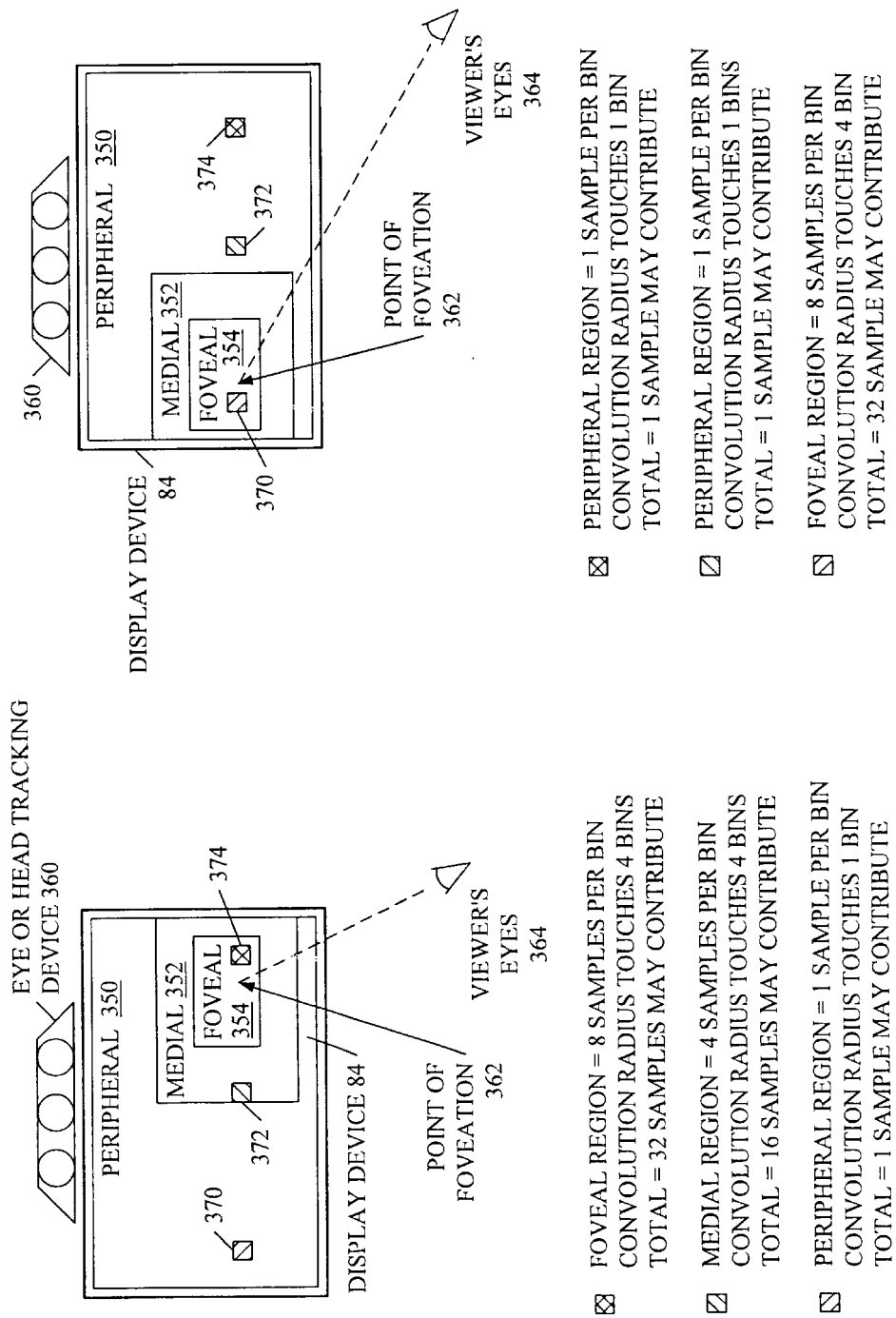
FIGS. 18A–B illustrate one embodiment of a graphics system configured to utilize input from an eye tracking or head-tracking device.

Turning now to FIGS. 18A–B, one embodiment of a method for apportioning the number of samples per pixel is shown. The method apportions the number of samples based on the location of the pixel relative to one or more points of foveation. In FIG. 18A, an eye- or head-tracking device 360 is used to determine the point of foveation 362 (i.e., the focal point of a viewer's gaze). This may be determined by using tracking device 360 to determine the direction that the viewer's eyes (represented as 364 in the figure) are facing. As the figure illustrates, in this embodiment, the pixels are divided into foveal region 354 (which may be centered around the point of foveation 362), medial region 352, and peripheral region 350.

Three sample pixels are indicated in the figure. Sample pixel 374 is located within foveal region 314. Assuming foveal region 314 is configured with bins having eight samples, and assuming the convolution radius for each pixel touches four bins, then a maximum of 32 samples may contribute to each pixel. Sample pixel 372 is located within medial region 352. Assuming medial region 352 is configured with bins having four samples, and assuming the convolution radius for each pixel touches four bins, then a maximum of 16 samples may contribute to each pixel. Sample pixel 370 is located within peripheral region 350. Assuming peripheral region 370 is configured with bins having one sample each, and assuming the convolution radius for each pixel touches one bin, then there is a one sample to pixel correlation for pixels in peripheral region 350. Note these values are merely examples and a different number of regions, samples per bin, and convolution radius may be used.

Turning now to FIG. 18B, the same example is shown, but with a different point of foveation 362. As the figure illustrates, when tracking device 360 detects a change in the position of point of foveation 362, it provides input to the graphics system, which then adjusts the position of foveal region 354 and medial region 352. In some embodiments, parts of some of the regions (e.g., medial region 352) may extend beyond the edge of display device 84. In this example, pixel 370 is now within foveal region 354, while pixels 372 and 374 are now within the peripheral region. Assuming the sample configuration as the example in FIG. 18A, a maximum of 32 samples may contribute to pixel 370, while only one sample will contribute to pixels 372 and 374. Advantageously, this configuration may allocate more samples for regions that are near the point of foveation (i.e., the focal point of the viewer's gaze). This may provide a more realistic image to the viewer without the need to calculate a large number of samples for every pixel on display device 84.

Figure 19A:
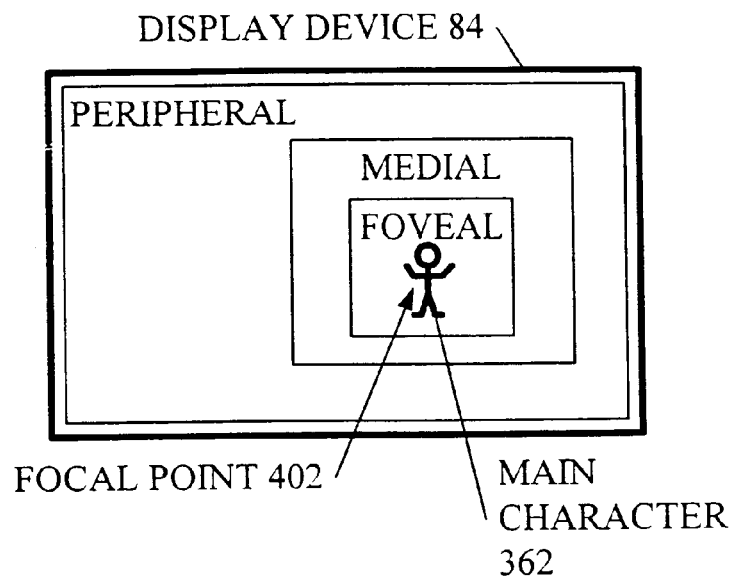
FIGS. 19A–B illustrate one embodiment of a graphics system configured to vary region position according to the position of a cursor or visual object.
Figure 19B:
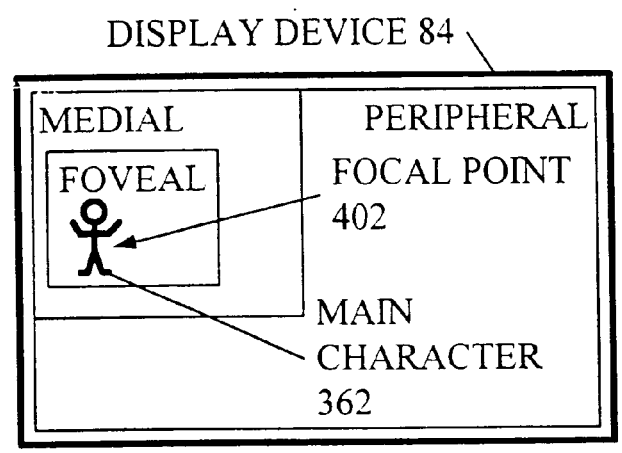

Turning now to FIGS. 19A–B, another embodiment of a computer system configured with a variable resolution super-sampled sample buffer is shown. In this embodiment, the center of the viewer's attention is determined by position of a main character 362. Medial and foveal regions are centered around main character 362 as it moves around the screen. In some embodiments, main character may be a simple cursor (e.g., as moved by keyboard input or by a mouse).

In still another embodiment, regions with higher sample density may be centered around the middle of display device 84's screen. Advantageously, this may require less control software and hardware while still providing a shaper image in the center of the screen (where the viewer's attention may be focused the majority of the time).

Single Sample per Pixel Support in a Multi-Sample Sample Buffer

The graphics system may designate a sample mode, e.g., single sample per pixel sample mode or multiple samples per pixel sample mode, on a per window or on a per object basis. The present invention thus includes an improved system and method for providing single sample per pixel support in a multi-sampled, convolved frame buffer. Such support would be useful, for example, for backwards compatibility with legacy software APIs (such as X-Windows), whose model of the frame buffer has no notion of more than one sample per pixel. In addition, such support may be useful where additional sharpness may be required in the image. Utilizing multi-sampling in those cases may introduce an amount of fuzziness that may not be desired. Borders, checkered board patterns, horizontal lines, vertical lines, etc. are examples of patterns that may require the multi-sampling feature to be turned off. Display regions drawn by such programs should behave the same as screen regions rendered using multi-sampling. This implies that either screen regions drawn by these legacy APIs should be multi-sampled or that the sample-to-pixel calculation unit should believe that legacy APIs are multi-sampled.

In one embodiment, the graphics system may maintain a window ID associated with each window. The window ID may specify a number of parameters or characteristics for pixels in a respective window, including sample mode, color attributes, source attributes, filter size, and filter type, among others. Thus, the sample mode and other characteristics for each window are defined by examining a window ID associated with each window. The window ID information for each window may be attached to each sample, each bin, or each pixel. The graphics processor maintains a look-up table where an association is maintained between each of the windows on the display and the sample mode for each window. Example sample modes include multiple samples per pixel, two samples per pixel, four samples per pixel, variable number of samples per pixel, etc. In addition, as noted above, the look-up table may also maintain other information about each window such as filter type, color attributes, and source attributes. Examples of color attributes may include true color/pseudo-color attribute, gamma-correction attribute, anti-aliasing attribute, depth-of-field attribute, and a brighter-than-bright attribute. Examples of source attributes may include a double-buffer attribute, and an overlay attribute. Examples of filter type include a an averaging filter, a convolution filter, a summing filter, a filtering function, a weighting filter, and a randomized function filter.

Color model attributes determine the interpretation of image sample data once the data been formatted and sent from the sample buffer to the video subsystem. For example, the TrueColor/Pseudocolor attribute determines whether a sample is an index into a colormap, or directly represents an R,G,B color value. Other examples include whether or not to gamma-correct the sample data, which color map to use if the values represent a color index, etc. Features such as anti-aliasing and depth-of-field features are also controlled through the use of Color Model attributes. Color Model Attributes are implemented within the sample-to-pixel calculation unit. The sample-to-pixel calculation unit operates to manage the Color Model Attribute tables.

The overlay attribute is a 2-bit field that determines whether and under what conditions the overlay bitplanes will be substituted for main bitplanes in the Red component field. Overlay planes allow a window system to display things like pop-up windows, menus, etc., without affecting the contents of the main RGB bitplanes. This improves efficiency by eliminating the need to save regions of the main bitplanes, which would be obscured by the popup windows, or having to make client applications redraw their windows to repair damage. Source Attributes are implemented within the sample buffer memory. Management of the Source Attribute tables is performed by the schedule units.

The sample buffer memory has built-in support for Window IDs necessary for implementing X-Windows. The sample buffer memory support for Window IDs follows the paradigm explained above: Source Attributes, which affect where in memory the information comprising an image sample is stored, are contained in tables within sample buffer memory itself and control the fetching and formatting of image data. Color Model Attributes, which control interpretation of the output data fields, preferably reside in tables in the video subsystem downstream of sample buffer memory. Thus, to obtain the Color Model associated with a particular window ID, the window ID index is preferably sent along with the output data.

Window attributes accessed by Window IDs form a very flexible way of supporting multiple simultaneous models of the sample buffer. However, not all combinations of Source and Color Model attributes may occur together. (For example, which colormap should be used with a truecolor image sample.) These situations offer the opportunity to reuse the existing bitplanes without restricting the semantics of the commonly occurring attribute combinations. Several such tradeoffs may be made in the design of the sample buffer memory. For example, when double-buffered Alpha is selected for output with the RGB values of image samples, the Color Model window ID may not be sent out of sample buffer memory. It is assumed that, in these cases, the Color Model would be restricted to TrueColor, gamma-corrected.

Having to choose between Alpha and Color Model window IDs may cause difficulties in implementing X-Windows support when double-buffered Alpha is being sent to the video subsystem. A minimal window system may be able to simultaneously display 8-bit and 24-bit visuals.

The following is a description of an embodiment of the existing sample buffer memory multiplexing that controls the format of image sample-data output from the sample buffer memory to the sample-to-pixel calculation unit. In this embodiment:

Window-IDs access tables within sample buffer memory for deciding which buffer to output or whether to output Overlay bitplanes in place of the Red bitplanes. These are Source Attributes.

Window-IDs are sent along with RGB or Overlay data to control downstream interpretation of the data in the sample-to-calculation unit. These are Color Model attributes. (Filtering and other special-purpose attributes controlling features implemented within the sample-to-calculation unit, fall within the category of Color Model attributes.)

When double-buffered Alpha is selected for output, there is no way to pass a "normal" window ID to the sample-to-calculation unit. This is because when double-buffered Alpha is selected, there are no Overlay planes available, and therefore there is no way to draw pop-up's, menu's etc., without causing damage to the main RGB bitplanes. In addition, when Alpha is sent along with the data, it is implicitly assumed that the alpha is for blending the sample buffer RGB data with RGB data from another source, as in a broadcast video application. Therefore, it is assumed that all the image samples in the sample buffer are preferably TrueColor samples when double-buffered alpha is selected for output. However, the use of Pseudocolor may not be limited to overlay-plane rendering and there may still be a strong desire to run a type of window system when using double-buffered alpha.

In one embodiment, the default sample mode comprises rendering multiple samples per pixel and applying a filter to selected samples to generate output pixels for the display as described above. The default mode is used for the whole display unless another sample mode is specified for a particular window. In some cases, it might be desirable to use alternate sample modes such as a "single sample per pixel" mode for certain windows on the display. Note that, "single sample per pixel", as used herein, does not only refer to rendering one sample per pixel. Rather, single sample per pixel mode implies that only a single sample is effectively used to form or generate the output pixel value.

Figure 21:
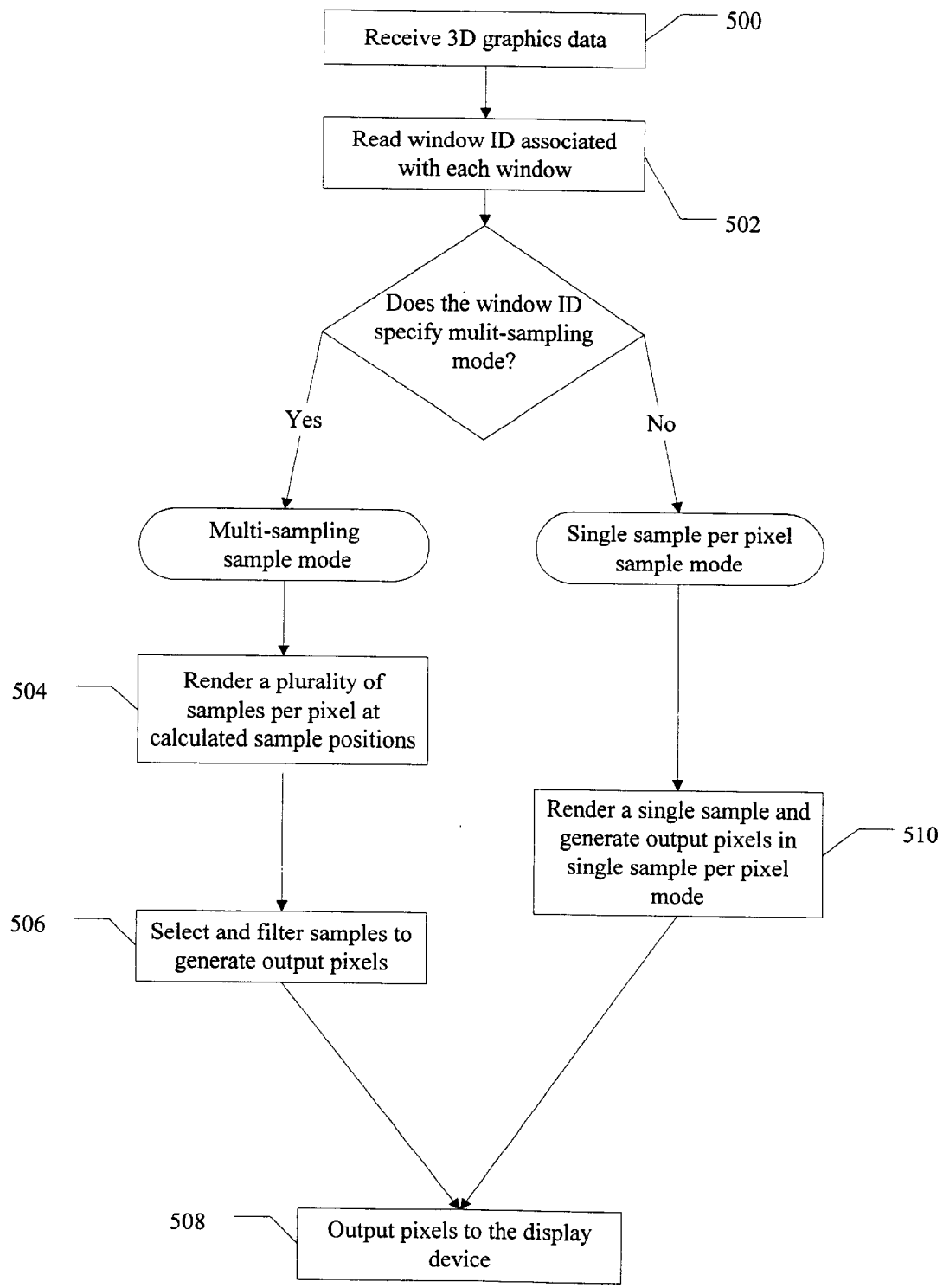
FIG. 21 is a flowchart diagram illustrating one embodiment of the invention for implementing two sample modes for outputting pixels to the display.

FIG. 21 is a high-level flowchart diagram illustrating the method of operation of the graphics system according to one embodiment of the invention. The method may be used in a graphics system to generate pixels for display on display device 84.

In Step 502, the graphics system receives graphics data. The graphics data may comprise polygon information, e.g., vertex data, that define one or more objects, such as one or more polygons and/or data in the form of pixel write commands that specify a location on the display and a corresponding pixel value. The graphics data may comprise data that is designated to use the default sample mode as well as data that is designated to use an alternative sample mode such as the "single sample per pixel" sample mode. The graphics system may determine the sample mode per sample, per bin, or per pixel according to the associated window ID.

The graphics data may then be processed according to different sample modes. Steps 504–508 of FIG. 21 describe the steps that the graphics system takes to process graphics data that is designated to use the default, regular multi-sampling sample mode. In Step 504, the graphics processor renders a plurality of samples per pixel at predetermined sample positions. As described above, the samples may be rendered based on a regular grid, a stochastic grid, or a perturbed grid. In Step 506, for each pixel, the sample-to-pixel calculation unit filters selected samples to compute a value.

Figure 22:
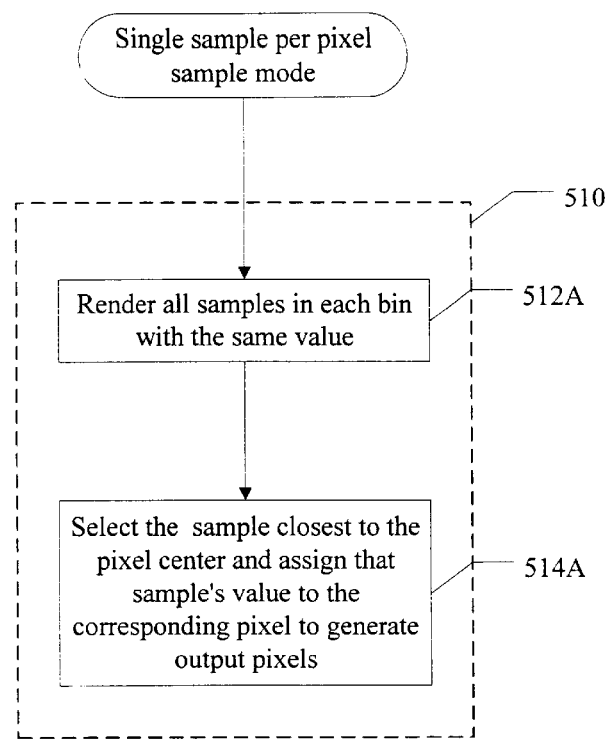
FIGS. 22–24 are flowchart diagrams illustrating various embodiments for implementing the single sample per pixel mode of FIG. 21.
Figure 23:
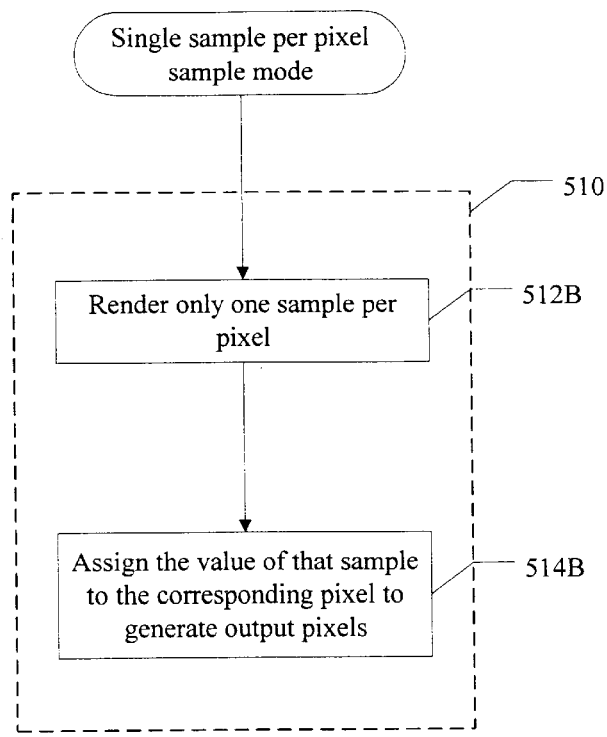
Figure 24:
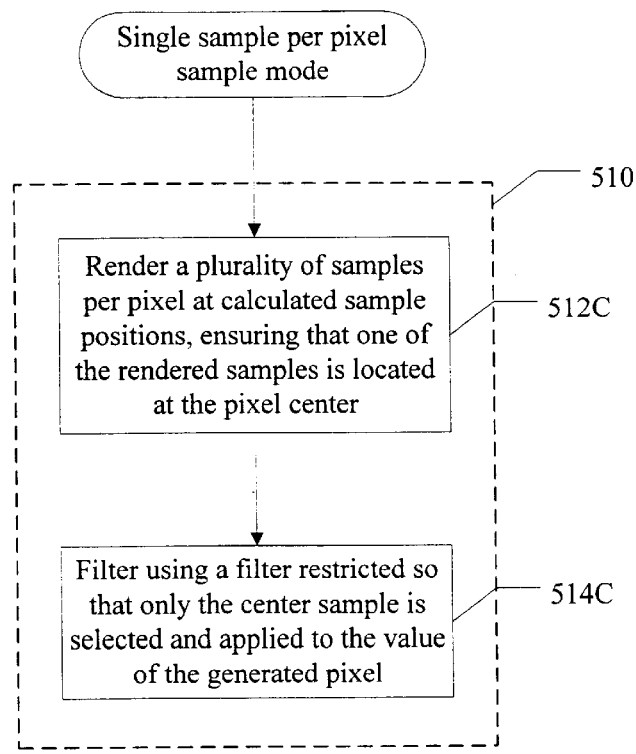

Alternatively, the received graphics data may comprise polygon or vertex information. In Step 510, one or more samples are rendered and corresponding output pixels are generated in the single sample per pixel mode. Step 510 describes a method for processing graphical data according to a "single sample per pixel" sample mode, one example of an alternate sample mode. FIGS. 22–24 illustrate various implementations of the "single sample per pixel" mode. Here it is presumed that the received graphics data in Step 500 comprises a single sample per pixel. The single value per pixel may be received, for example, by an external system like X-Windows that assumes a traditional frame buffer and no multisampling. The single value may be received, for example, in the form of pixel write commands.

In step 508, both the pixel output from the regular multi-sampling sample mode and the pixel output from the "single sample per pixel" sample mode are combined, and output is sent to the display. The value for each pixel is then output to the display as shown in step 508. The multi-sampling mode is described in detail above.

The high-level flowchart of FIG. 22 describes, in more detail, one embodiment of the method for implementing the alternative "single sample per pixel" sample mode of Step 510. The steps in FIG. 22 are preferably performed for each pixel. In Step 512A, the graphics system assigns all the samples in the same bin (in one embodiment, the area occupied by one pixel) with the single sample value received for that pixel. The single sample received may be referred to as sample 0. Thus, this embodiment uses multiple samples per pixel for all pixels regardless of the sample mode. However, for pixels in a window designated with a single sample per pixel sample mode, the samples for a respective pixel all have the same value.

In step 514A, the sample-to-pixel calculation unit may select the sample that is closest to the center of the pixel and assigns that value to the pixel without performing any filtering. Since all the samples that correspond to a pixel have the same value, the value of any sample may be selected and assigned to the pixel.

The high-level flowchart of FIG. 23 describes, in more detail, another embodiment of a method for implementing the alternative "single sample per pixel" sample mode of Step 510. The steps in FIG. 23 are preferably performed for each pixel in the respective window. In Step 512B, the graphics processor is operable to render only a single sample per pixel. The single value per pixel may be the one received, for example, from an external system like X-Windows. Alternatively, the rendering units may render only a single sample per pixel for a given window to create a desired display effect.

In step 514B, the graphics system may not perform any filtering. The graphics system may simply output the value of the single sample that corresponds to each pixel to the display. The graphics system may perform filtering with a filter that has a reduced range so as to only include the single sample when calculating the value for each pixel. The graphics system may also perform filtering using an extended filter. In this case, the value of each will be approximately equal to each pixel's corresponding single sample since, depending on the extent of the filter, other samples corresponding to other pixels may be included in the calculation for the value of each pixel.

The high-level flowchart of FIG. 24 describes, in more detail, yet another embodiment of a method for implementing the alternative "single sample per pixel" sample mode of Step 510. The steps in FIG. 24 are preferably performed for each pixel. In Step 512C, the graphics system renders a plurality of samples per pixel, as is the case with windows that are designated to use the default multi-sampling sample mode. In one embodiment, the graphics system ensures that one of the rendered samples lies in the center of the bin or pixel area. In step 514C, sample-to-pixel calculation unit 170 performs filtering on the rendered samples to compute the values of the output pixels. In one embodiment, the sample-to-pixel calculation unit 170 restricts the range of the filter for each pixel to only select the sample located at the center of the bin or pixel area. Alternatively, if samples are not generated exactly at the pixel center, the sample value closest to the center is used as the output pixel value.

Figure 25:
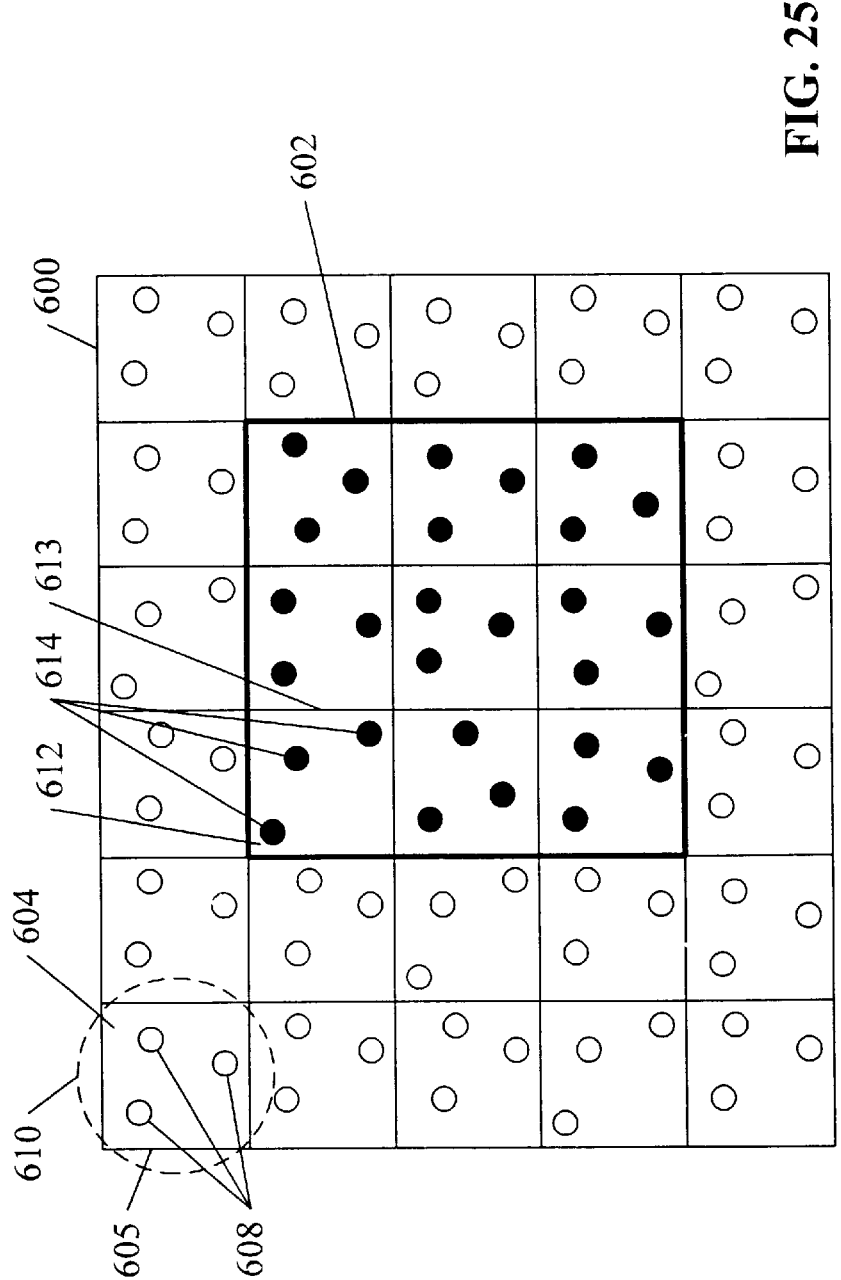
FIG. 25 illustrates one embodiment of a graphics system configured to generate samples with the same value in the area of each pixel for a window of the display.

FIG. 25 shows one example of the sample buffer according to one embodiment of the invention. The sample buffer in FIG. 25 is an example of the method described in the flowchart of FIG. 22. Sample buffer 600 displays windows utilizing the default multi-sampling sample mode together with windows utilizing the "single sample per pixel" sample mode. Window 602 is an example of a window that uses the "single sample per pixel" sample mode. Window 602 may, for example, be displaying information received from a legacy API system such as X-Windows. Samples 608, which are contained within bin 604, are rendered utilizing the default multi-sampling sample mode techniques described above. The value of pixel 605 is calculated using a filtering process that is also described above. The extent of the filter used may be restricted within bin 604 or the filter may include samples from neighboring bins. A typical extent of the filter is shown by circle 610.

Samples 614, corresponding to pixel 613 in bin 612, are all within window 602 that has been designated to use a "single sample per pixel" sample mode. In one embodiment, for window 602, the graphics processor receives one sample per pixel and subsequently replicates the value of that sample to all the samples within bin 612, i.e., samples 614 are all set to the value passed to the graphics processor. The sample-to-pixel calculation unit then assigns to pixel 613 the value of any of the samples, e.g., the value of the closest sample to the center of the pixel. As a result, pixel 613 is assigned the single value passed to the graphics processor and corresponding to that pixel.

In another embodiment, the sample-to-pixel calculation 170 unit may perform regular filtering across all of sample buffer 600, including window 602. Since all the values in the bins corresponding to pixels within window 602 have the same value, the resulting image for window 602 will be similar or identical to the image produced for window 602 in the case a single value was selected and no filtering was performed for samples inside window 602.

Figure 26:
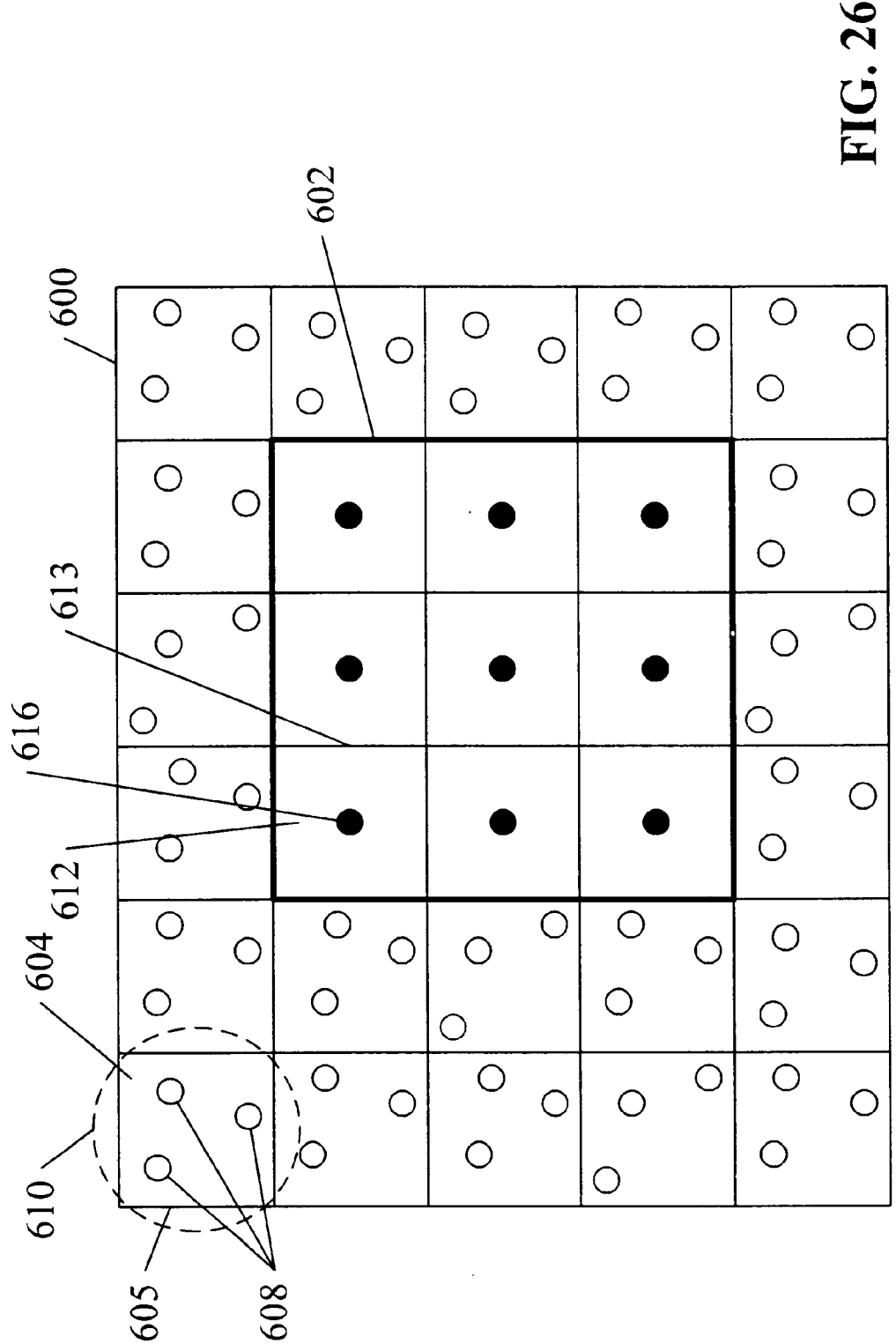
FIG. 26 illustrates one embodiment of a graphics system configured to generate a single sample for each pixel for a window of the display.

FIG. 26 shows an example of another embodiment of the current invention. The sample buffer in FIG. 26 is an example of the method described in the flowchart of FIG. 23. As shown, for window 602, the graphics processor renders only one sample per pixel, e.g., sample 616. Since there is only one sample in bin 612, the sample-to-pixel calculation unit assigns the value of that sample to the pixel without performing any filtering. In another embodiment, the sample-to-pixel calculation unit may apply a filter to calculate the value of the pixel. To ensure that no other samples are included in the calculation for the value of the pixel, the filter may be restricted to the bin containing the pixel. For example, the filter used to calculate the value for pixel 613 may be restricted to bin 612.

Figure 27A:
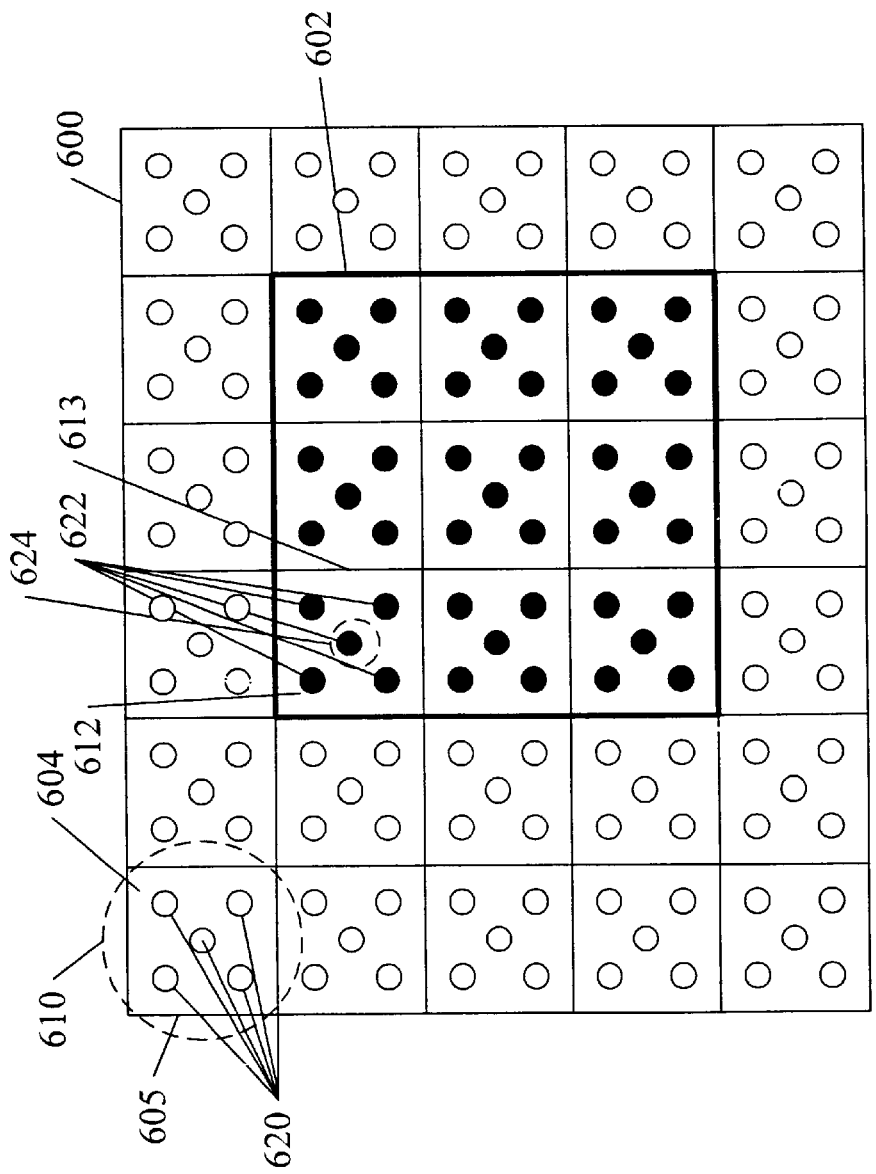
FIGS. 27A–C are diagrams illustrating one embodiment of a graphics system configured to generate samples per pixel that are on a regular grid with one sample located in the center and then using a narrow filter assign to the pixel the value of the center sample, for a window of the display.

FIG. 27A shows an example of yet another embodiment of the current invention. The sample buffer shown in FIG. 27A is an example of the method described in the flowchart of FIG. 24. As shown, a regular grid is used for the samples generated by the graphics processor with one of the samples located in the center of the bin. The same regular grid is used across the whole sample buffer 600; both for windows using the regular multi-sampling sample mode and for windows that are using the "single sample per pixel" sample mode like window 602. By ensuring that one of the samples is located in the center of the bin, the center samples in a window that uses a "single sample per pixel" sample mode have the same value as the single value per pixel that may be passed to the graphics system for window 602. Samples 620 and samples 622 are all examples of samples that are rendered on a regular grid.

In one embodiment, the sample-to-pixel calculation unit reduces the effective area of the filter applied to calculate the value for each pixel within window 602. The reduction is such that only one sample per pixel is effectively included in the averaging performed to calculate the value for the pixel. Circle 624 shows an example of the effective area of the filter used in by the sample-to-pixel calculation unit within window 602.

In another embodiment, a stochastic grid may be used both for windows using the regular multi-sampling sample mode and for windows that are using the "single sample per pixel". In this embodiment, for samples rendered within window 602, the sample closest to the center of the pixel will have a value that is approximately equal to the value that may be passed to the graphics system for window 602.

Figure 27B:
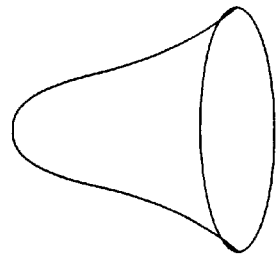
Figure 27C:
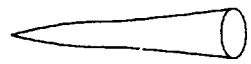

FIG. 27B shows a typical extent of the filter for windows using the regular multi-sampling sample mode, and FIG. 27C shows a typical extent of the filter for windows using the "single sample per pixel" sample mode like window 602.

Figure 28:
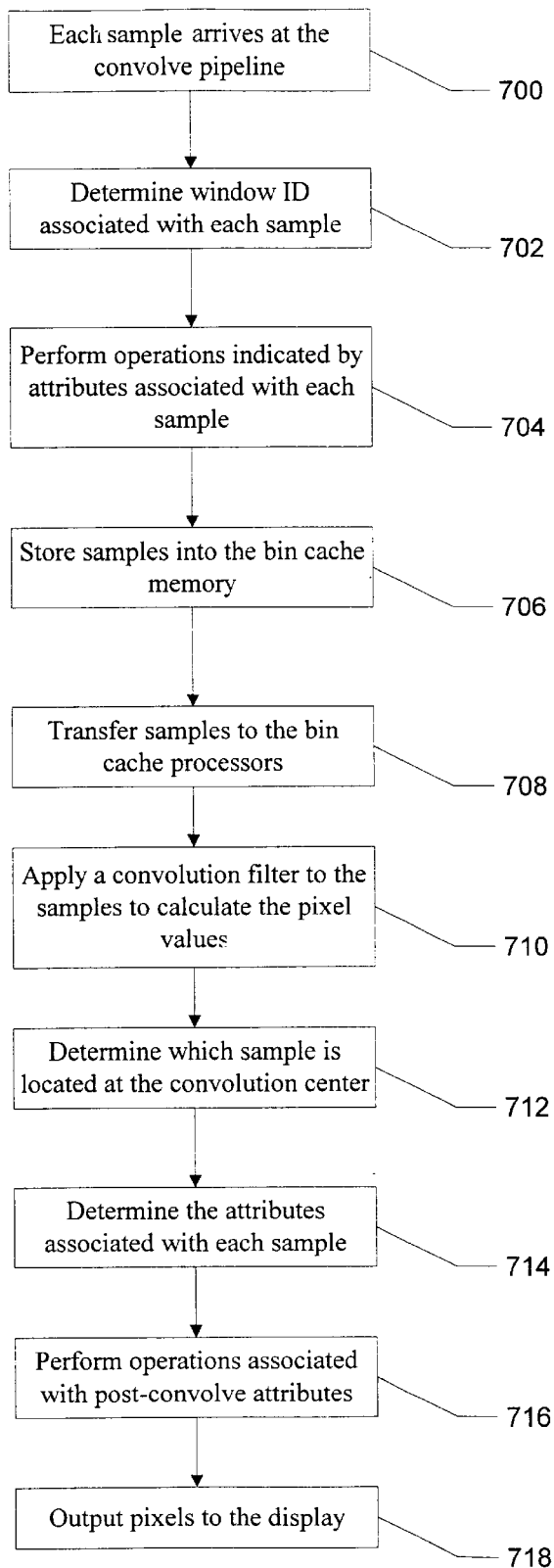
FIG. 28 is a flowchart diagram illustrating one embodiment of the invention for implementing a single sample per pixel sample mode.

FIG. 28 is a more detailed flowchart describing a method performed by a sample-to-pixel calculation unit for implementing a single sample per pixel sample mode according to one embodiment of the invention.

In Step 700, each sample arrives at the convolve pipeline from the graphics processor. Multiple samples per pixel may be received or a single sample per pixel may be received. In addition, each sample may be associated with a window ID that further associates each sample, through a look-up table, with certain window attributes, such as color attribute, source attribute, sample mode, and filter type. In Step 702, for each sample, the window ID is read, and using a look-up table, the window attributes are determined.

In Step 704, operations are performed according to the pre-convolve attributes associated with each sample. Examples of such attributes include: color mapping, replicate sample 0 into all other samples in the same bin, etc.

In Step 706, the samples are stored into the bin cache memory, and in Step 708, the samples are transferred to the bin cache processors.

In Step 710, filtering is performed on the samples. The filter type used may be determined according to a window ID associated with each sample, which further associates the sample with certain window attributes, one of which is the filter type. Examples of filter types are an averaging filter, a convolution filter, a summing filter, a filtering function, a weighting filter, and a randomized function filter.

In Step 712, the sample-to-pixel calculation unit may determine which sample is located at the center of the filtering. In one embodiment, the value of that sample is assigned to the corresponding pixel.

In Step 714, the sample-to-pixel calculation unit may determine the attributes associated with each sample by reading the window ID associated with each sample. In Step 716, the sample-to-pixel calculation unit performs any post-convolve processing, such as gamma correction.

Finally, in step 718, the value for each pixel is output to the display.

The increases in image quality offered by the multi-sampled sample buffer are compelling. However, a multi-sampled sample buffer may present problems to legacy software APIs (one of which is X-Windows), whose model of the frame buffer has no notion of more than one RGB sample per pixel. The semantics of X-Windows rendering, reading, and writing are preferably accommodated so that X-Windows may coexist with multi-sampled rendering methods in the sample buffer.

Another problem is with duplicating X-Windows visual quality, which, ironically, includes correct reproduction of "jaggies". While many users will select X-Windows fonts and decorations that look pleasing when anti-aliased, many others would still rather have the non-aliased fonts. It would thus be desirable to be able to "turn off" anti-aliasing on a pixel-by-pixel basis.

In addition, the graphics system of the present invention supports straightforward and high quality video resampling. Screen regions drawn by X-Windows programs should behave the same as screen regions rendered using super-sampling; both kinds of regions should be easily resampled. This implies that screen regions drawn by X-Windows are preferably super-sampled in the sample buffer. At least, the sample-to-pixel calculation unit must believe that X-Windows pixels are multi-sampled.

The multi-sampled nature of the sample buffer need not be exposed to X-Windows. The most difficult aspects of the multi-sampled sample buffer to hide have to do with readbacks, window moving, and copy-unders. All of these involve reading samples.

In order to limit the effort involved in implementing X-Windows, it would be preferable to avoid exposing the multi-sample nature of the sample buffer to the X-Windows API's. A certain limited number of routines in the device-dependent layer of the X-server may need to know about multi-samples.

To draw an X-Windows image in a super-sampled buffer that looks the same as the image would appear on a traditional frame buffer, it would be sufficient to make all the samples in a pixel equal to the value supplied by X-Windows calls. This may be done by "replicating" pixel values drawn by X-Windows calls, into image samples in the sample buffer, such that all image samples in bins correspond to pixels in the traditional buffer will have the same value as the single pixel value supplied by the software.

The replicating operation may be done during the write operations into the sample buffer. In some cases, it may be more efficient and convenient for the replicating to be done by the sample-to-pixel calculation unit during sample buffer read-out, in the intermediate buffering stages before the sample data is actually filtered. Doing replication in the sample-to-pixel calculation unit has the advantage that the cost of pixel reading and writing is minimum and independent of the number of samples per pixel. Replicating samples in the sample-to-pixel calculation unit works best for X-visuals that will be rendered by X-Windows.

In some cases, it may be better to replicate the samples going into the sample buffer. For example, if X-Windows rendering routines are used to annotate a multi-sampled X-visual, it would be better to replicate the samples as they are rendered into the sample buffer. This is more computationally intensive but avoids modifying the Color model attributes of the samples in the visual. The device-dependent layer of X-Windows handles the decision of what type of rendering to perform.

An application that has opened a single-sampled X-visual may only render to that visual using X-Lib routines. As these routines call upon services in the device-dependent layer (DDX), the visual attributes of the X-visual may be examined and it may be determined that for this visual, only Sample 0 will be written. The window ID of this visual could instruct the sample-to-pixel calculation unit to replicate all Sample 0's to the other samples corresponding to the pixel.

An application may also open a multi-sampled X-visual. The application may use Direct Graphics Access (DGA) rendering calls such as Java3D or OpenGL, or it may mix DGA calls with XLib calls. Even if the application uses only DGA calls, sometimes a DGA library may rely on XLib for certain kinds of rendering. In either event, when the calls reach the DDX layer, the visual attributes of the X-visual are examined again. For calls that reach DDX via XLib, it may be determined that, for this type of visual, the samples should be replicated going into the sample buffer. (Calls which reach DDX directly from the DGA layer already know about multisampling, and may set each sample uniquely without replicating.) The window ID of this type of visual instructs the sample-to-pixel calculation unit to use all the multi-samples.

Each sample in an X-visual has the same window ID. The window ID is defined by the planes for each sample. The ColorModel attributes indexed by that window ID include a Filter attribute that defines the sample as "Filtered: filter the samples and display result" (i.e., super-sampled) or as "Unfiltered: find sample nearest the convolution kernel center (pixel center) and display that sample as the pixel color" (i.e., normal X-Windows pixel). Another ColorModel attribute indexed by the window ID includes a Replicate-Sample0 attribute, which controls whether the first sample will be replicated and used in place of other samples in a bin. These two attributes together allow X-Windows to get either unfiltered X-pixels or filtered, multi-sampled pixels on a pixel-by-pixel basis.

Note that, this scheme makes all samples look uniform to the circuitry, which actually does the filtering: it will either filter samples, or it will pick a sample closest to the convolution kernel center and output that as the result of the "filtering". If samples are replicated from Sample 0, and filtering is turned off, the effect is to display sample 0 as the color of the pixel. Note that, this is compatible with video resizing (changing the resolution of the display screen). The only exception is that if video resizing is in effect, the Filter=0 attribute may be overridden and filtering may be applied to X pixels as well as to multi-sampled pixels. This could be more visually pleasing than straight decimation of pixels.

X-visuals opened for X-Window applications and window server, as well as for non-super-sampled DGA applications would be assigned the UNFILTERED and REPLICATE-SAMPLE-ZERO window attributes. The DDX or DGA rendering code for such windows would select these visual attributes.

Windows opened for super-sampled DGA applications would be assigned the FILTERED and MULTI-SAMPLED window attributes. If DDX were called to render in a super-sampled DGA window, DDX would select the Drawing Mode as REPLICATE-SAMPLE-ZERO, causing the color passed in for the pixel to be replicated as the color was written into the sample buffer to all the samples currently in effect. Only DDX would need to know the number of samples per pixel.

Whenever the current window ID changes (as part of a drawing context change), DDX would look up the new window's attributes to determine if it is FILTERED or UNFILTERED, MULTI-SAMPLED or REPLICATE-SAMPLE-ZERO. DDX would set the drawing mode appropriately, depending on these visual attributes.

Consider the case of a pop up menu drawn in the main color planes over a window which is multisampled: The save-under could save the sample zero values (read SAMPLE-ZERO) regardless of the save under area type (FILTERED or UNFILTERED) The pop up write would write with its own window ID (prepared in the sample buffer color planes for sample0 ONLY), which would have the UNFILTERED attribute and would use the REPLICATE-SAMPLE-ZERO Drawing Mode (normal XLib window behavior).

The restore would write back the previously saved sample zero values, complete with their window ID values. The image would be completely undisturbed because the other samples in the bin were not disturbed in the sample buffer. Sample O's attributes would no longer say REPLICATE-SAMPLE-ZERO, so the other samples would again be used.

DDX could render into a correlated transparent overlay (UNFILTERED, REPLICATE-SAMPLE-ZERO) and DGA into the underlay (FILTERED, MULTISAMPLED), which gives best quality and speed for BOTH types of rendering. This also gives quick pop up menus, etc, because there is no save under needed and there is no damage to repair. However, this would not possible if the DGA window is double buffering (in that case, there is no overlay available).

A common X-Windows operation is rearranging the locations and overlaps of windows on the screen. Efficient implementations of X-Windows attempt to do this without requiring X-clients to redraw the content of the windows after the clients are moved unless necessary. The window manager moves visible portions of windows from their old locations to their new locations by reading and writing pixels in the sample buffer.

Moving a pixel rendered by X-Windows involves copying the sample 0 from the sample 0's old location to the new location, in a way similar to a traditional frame buffer. However, when moving multi-sampled pixels, the location of samples may be different in different pixels. Moving samples computed for one pixel location to another pixel location amounts to scrambling the sub-pixel locations of the samples. This may cause visual artifacts not intended by the copy operation.

One way to place samples in the new pixel location is to re-compute the samples from the geometry that created the original samples. This is equivalent to asking X-clients with multi-sampled visuals to redraw their windows when the windows move. This is unsatisfactory from an X-Windows perspective because the application may not be able to repair the window in a timely manner.

However, moving the samples results in good visual performance. A critical aspect of sub-pixel positioning occurs during the sampling of geometry, during rendering and before samples are written to the sample buffer. Once the geometry is sampled and the samples are in the sample buffer, moving them to a new location may cause relatively minor variations in the way the samples are weighted by the portion of the filtering kernel that intersects the bin in which the samples reside. These are smaller changes than those that could result in the geometry-sampling phase (where a slight change in position could move a sample from intersecting a triangle to missing the triangle, for example). That is why the visual artifacts are minor. Furthermore, the more samples there are in a bin, the less noticeable are the artifacts. The best combination of visual quality, performance, and availability of the methods and resources is to copy the samples to the new location.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:
    a graphics processor operable to receive 3D graphics data, wherein the graphics processor is operable to render a plurality of samples from the 3D graphics data;
    a sample buffer coupled to said graphics processor for storing said samples;
    a sample-to-pixel calculation unit coupled to said sample buffer, wherein the sample-to-pixel calculation unit is operable to select and filter stored samples to generate output pixels to a display;
    wherein the graphics system is operable to generate output pixels to the display according to a sample mode, wherein the sample mode indicates a number of samples used in generating the output pixels to the display.

2. The graphics system of claim 1, wherein the sample mode includes a first sample mode indicating a plurality of samples per pixel, and wherein the sample mode includes a second sample mode indicating one sample per pixel.

3. The graphics system of claim 2, wherein the graphics system generates a first plurality of pixels using the first sample mode, and wherein the graphics system generates a second plurality of pixels using the second sample mode;
    wherein the graphics system is operable to utilize a plurality of samples in generating each of the first plurality of output pixels;

wherein the graphics system is operable to utilize a single sample in generating each of the second plurality of output pixels.

4. The graphics system of claim 3, wherein the graphics processor is operable to render a plurality of samples per pixel for each of the first plurality of output pixels, wherein the graphics processor is operable to render only a single sample per pixel in generating each of the second plurality of output pixels.

5. The graphics system of claim 4, wherein the sample-to-pixel calculation unit uses a plurality of samples per pixel in generating each of the first plurality of output pixels; wherein the sample-to-pixel calculation unit uses a single sample per pixel in generating each of the second plurality of output pixels.

6. The graphics system of claim 3, wherein the graphics processor is operable to render a plurality of samples per pixel for each of the output pixels regardless of the sample mode.

7. The graphics system of claim 6, wherein, for each of the second plurality of output pixels using the second sample mode, the graphics processor is operable to render one sample value per pixel, and is operable to replicate said sample value to other samples corresponding to the pixel.

8. The graphics system of claim 7, wherein, for each respective pixel of the second plurality of output pixels, the sample-to-pixel calculation unit is operable to select one of the sample values corresponding to the respective pixel for output to the display.

9. The graphics system of claim 7, wherein, for each respective pixel of the second plurality of output pixels, the sample-to-pixel calculation unit is operable to select one of the sample values closest to the respective pixel center for output to the display.

10. The graphics system of claim 7, wherein the sample-to-pixel calculation unit is operable to select and filter a plurality of stored samples to generate output pixels to a display regardless of the sample mode.

11. The graphics system of claim 10, wherein, for at least the second plurality of output pixels, the sample-to-pixel calculation unit is operable to use a non-overlapping filter.

12. The graphics system of claim 7, wherein the sample-to-pixel calculation unit is further operable to select and filter said stored samples to generate output pixels to a display in any one of multiple screen resolutions regardless of the sample mode.

13. The graphics system of claim 6, wherein the sample-to-pixel calculation unit uses a plurality of samples per pixel in generating each of the first plurality of output pixels; wherein the sample-to-pixel calculation unit uses a single sample per pixel in generating each of the second plurality of output pixels.

14. The graphics system of claim 13, wherein the sample-to-pixel calculation unit selects a single sample per pixel closest to the pixel center of the pixel in generating each of the second plurality of output pixels.

15. The graphics system of claim 6, wherein the sample-to-pixel calculation unit uses a first larger filter in generating each of the first plurality of output pixels; wherein the sample-to-pixel calculation unit uses a second smaller filter in generating each of the second plurality of output pixels.

16. The graphics system of claim 1, wherein the sample mode is assigned on a per window basis.

17. The graphics system of claim 16, wherein the sample mode includes a first sample mode indicating a plurality of samples per pixel, and wherein the sample mode includes a second sample mode indicating one sample per pixel.

18. The graphics system of claim 17, wherein the graphics system is operable to utilize a plurality of samples in generating each of a first plurality of output pixels in a first window; wherein the graphics system is operable to utilize only a single sample in generating each of a second plurality of output pixels in a second window.

19. The graphics system of claim 17, wherein the graphics system is operable to display a plurality of windows on the display; wherein a first window includes a first sample mode indicating a plurality of samples per pixel for pixels displayed in the first window, and wherein a second window includes a second sample mode indicating one sample per pixel for pixels displayed in the second window; wherein the first window includes a first plurality of output pixels, and wherein the second window includes a second plurality of output pixels; wherein the graphics system is operable to utilize a plurality of samples in generating each of the first plurality of output pixels in the first window; wherein the graphics system is operable to utilize a single sample in generating each of the second plurality of output pixels in the second window.

20. The graphics system of claim 19, wherein the graphics system is operable to display a plurality of windows on the display; wherein at least a subset of the windows include a window id value indicating a sample mode for the window.

21. The graphics system of claim 16, wherein the graphics system is operable to display a plurality of windows on the display; wherein at least a subset of the windows includes a window ID value indicating a sample mode for pixels displayed in the window.

22. The graphics system of claim 21, wherein the window ID further specifies one or more of a sample mode, source attributes, and color attributes.

23. The graphics system of claim 22, wherein said source attributes comprise one or more of a double-buffer attribute, and an overlay attribute.

24. The graphics system of claim 22, wherein said color attributes comprise one or more of a true color/pseudo-color attribute, gamma-correction attribute, anti-aliasing attribute, depth-of-field attribute, brighter-than-bright attribute.

25. The graphics system of claim 21, further comprising: a memory storing a look up table, wherein the look up table is addressable using a window ID value, wherein the look up table stores one or more of a sample mode, source attributes, and color attributes.

26. The graphics system of claim 25, wherein said source attributes comprise one or more of a double-buffer attribute, and an overlay attribute.

27. The graphics system of claim 25, wherein said color attributes comprise one or more of a true color/pseudo-color attribute, gamma-correction attribute, anti-aliasing attribute, depth-of-field attribute, brighter-than-bright attribute.

28. The graphics system of claim 1, wherein the sample-to-pixel calculation unit is operable to select and filter stored samples and generate output pixels which are provided directly to a display with no frame buffer therebetween.

29. The graphics system of claim 1, wherein said sample buffer is configured to double buffer at least a portion of each stored sample.

30. The graphics system of claim 1, wherein said sample-to-pixel calculation unit is configured to filter samples to form output pixels on one of: a real time basis or an on-the-fly basis.

31. A graphics system comprising:
- a graphics processor operable to receive 3D graphics data, wherein the graphics processor is operable to render a plurality of samples from the 3D graphics data;
- a sample buffer coupled to said graphics processor for storing said samples;
- a sample-to-pixel calculation unit coupled to said sample buffer, wherein the sample-to-pixel calculation unit is operable to select and filter stored samples to generate output pixels to a display;
- wherein the graphics system is operable to utilize a plurality of samples in generating each of a first plurality of output pixels;
- wherein the graphics system is operable to utilize a single sample in generating each of a second plurality of output pixels.

32. The graphics system of claim 31,
- wherein the sample-to-pixel calculation unit is operable to utilize a plurality of samples in generating each of a first plurality of output pixels;
- wherein the sample-to-pixel calculation unit is operable to utilize a single sample in generating each of a second plurality of output pixels.

33. A method for generating pixels for display in a graphics system, the method comprising:
- receiving 3D graphics data;
- rendering a plurality of samples into a sample buffer in response to the 3D graphics data;
- generating output pixels in response to the samples stored in the sample buffer, wherein said generating includes selecting and filtering stored samples to generate the output pixels to the display;
- wherein at least one of said rendering and said generating operates according to a sample mode, wherein the sample mode indicates a number of samples used in generating the output pixels to the display.

34. The method of claim 33, wherein the sample mode includes a first sample mode indicating a plurality of samples per pixel, and wherein the sample mode includes a second sample mode indicating one sample per pixel.

35. The method of claim 34, wherein said generating generates a first plurality of pixels using the first sample mode, and wherein said generating generates a second plurality of pixels using the second sample mode;
- wherein said generating utilizes a plurality of samples in generating each of the first plurality of output pixels;
- wherein said generating utilizes only a single sample in generating each of the second plurality of output pixels.

36. The method of claim 35,
- wherein said rendering includes rendering a plurality of samples per pixel for each of the first plurality of output pixels;
- wherein said rendering includes rendering only a single sample per pixel in generating each of the second plurality of output pixels.

37. The method of claim 36, wherein said generating uses a plurality of samples per pixel in generating each of the first plurality of output pixels;
- wherein said generating uses a single sample per pixel in generating each of the second plurality of output pixels.

38. The method of claim 33, wherein said generating output pixels comprises selecting and filtering stored samples to generate output pixels which are provided directly to the display with no frame buffer therebetween.

39. The method of claim 33, wherein said rendering the plurality of samples into the sample buffer includes double buffering at least a portion of each stored sample.

40. The method of claim 33, wherein said generating comprises selecting and filtering stored samples to form output pixels on one of: a real time basis or an on-the-fly basis.

* * * * *